(12) United States Patent
Abe et al.

(10) Patent No.: US 7,740,753 B2
(45) Date of Patent: *Jun. 22, 2010

(54) ULTRAVIOLET RADIATION WATER TREATMENT SYSTEM

(75) Inventors: Norimitsu Abe, Kawasaki (JP); Takeshi Ide, Yamato (JP); Takeshi Matsushiro, Yokohama (JP); Hiroyuki Suzuki, Kawasaki (JP); Seiichi Murayama, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/068,918

(22) Filed: Feb. 13, 2008

(65) Prior Publication Data

US 2008/0210608 A1 Sep. 4, 2008

Related U.S. Application Data

(63) Continuation of application No. 11/373,996, filed on Mar. 14, 2006.

(30) Foreign Application Priority Data

Mar. 29, 2005 (JP) ............................ 2005-095943
Nov. 30, 2005 (JP) ............................ 2005-346147

(51) Int. Cl.
*B01D 17/12* (2006.01)

(52) U.S. Cl. .................. 210/87; 250/438; 210/96.1; 210/192; 210/202; 210/205; 210/259; 422/186.3

(58) Field of Classification Search .................. 210/85, 210/87, 96.1, 96.2, 103, 134, 143, 202–206, 210/257.1, 257.2, 259, 192, 748, 702, 712, 210/748.1; 422/24, 186.11, 186.3; 250/435–438; 700/273; 706/25
See application file for complete search history.

(56) References Cited

U.S. PATENT DOCUMENTS 3,577,341 A * 5/1971 Keith et al. .................. 210/712

(Continued)

FOREIGN PATENT DOCUMENTS

GB 2272171 A 5/1994

(Continued)

OTHER PUBLICATIONS

Kimura et al., "Investigation on Basic Performance Evaluation of Particle Measuring Devices," Water System Association Magazine (Oct. 2002), 71:31-51.

(Continued)

*Primary Examiner*—Joseph W Drodge
(74) *Attorney, Agent, or Firm*—Finnegan, Henderson, Farabow, Garrett & Dunner, L.L.P.

(57) ABSTRACT

A water treatment system that performs a water purifying treatment by use of ultraviolet radiation, comprises a front stage ultraviolet radiation device for radiating ultraviolet light in a front stage process in a water purifying treatment process, a rear stage ultraviolet radiation device for radiating ultraviolet light in a rear stage process, and a controller for controlling these ultraviolet radiation devices.

8 Claims, 10 Drawing Sheets

U.S. PATENT DOCUMENTS

| | | | | |
|---|---|---|---|---|
| 4,204,956 | A * | 5/1980 | Flatow | 210/87 |
| 5,236,595 | A * | 8/1993 | Wang et al. | 210/669 |
| 5,376,281 | A * | 12/1994 | Safta | 210/748 |
| 5,505,843 | A * | 4/1996 | Obuchi et al. | 210/94 |
| 5,774,633 | A * | 6/1998 | Baba et al. | 706/25 |
| 5,780,860 | A * | 7/1998 | Gadgil et al. | 250/432 R |
| 6,090,296 | A * | 7/2000 | Oster | 210/748 |
| 6,284,205 | B1 * | 9/2001 | Murata et al. | 422/186.11 |
| 6,428,705 | B1 * | 8/2002 | Allen et al. | 210/638 |
| 6,607,668 | B2 * | 8/2003 | Rela | 210/321.6 |
| 2003/0034292 | A1 | 2/2003 | Rela | |
| 2004/0061069 | A1 | 4/2004 | Schalble et al. | |

FOREIGN PATENT DOCUMENTS

| | | |
|---|---|---|
| JP | 5-169059 | 7/1993 |
| JP | 2000-246263 | 9/2000 |
| JP | 2001-47040 | 2/2001 |
| JP | 2002-59194 | 2/2002 |
| JP | 2002-263645 A | 9/2002 |
| JP | 2004-188273 | 7/2004 |

OTHER PUBLICATIONS

An Office Action mailed by the Canadian Intellectual Property Office on Mar. 31, 2009, for Canadian Application No. 2,541,275.

A Notice of Reasons for Rejection mailed by the Japanese Patent Office on Nov. 4, 2009, for Japanese Application No. 2008-095943.

A Second Office Action mailed by the Chinese Intellectual Property Office on Aug. 14, 2009, for Chinese Application No. 200610071878, with English translation.

An Office Action mailed by the Canadian Patent Office on Dec. 21, 2009, for Canadian Application No. 2,541,275.

* cited by examiner

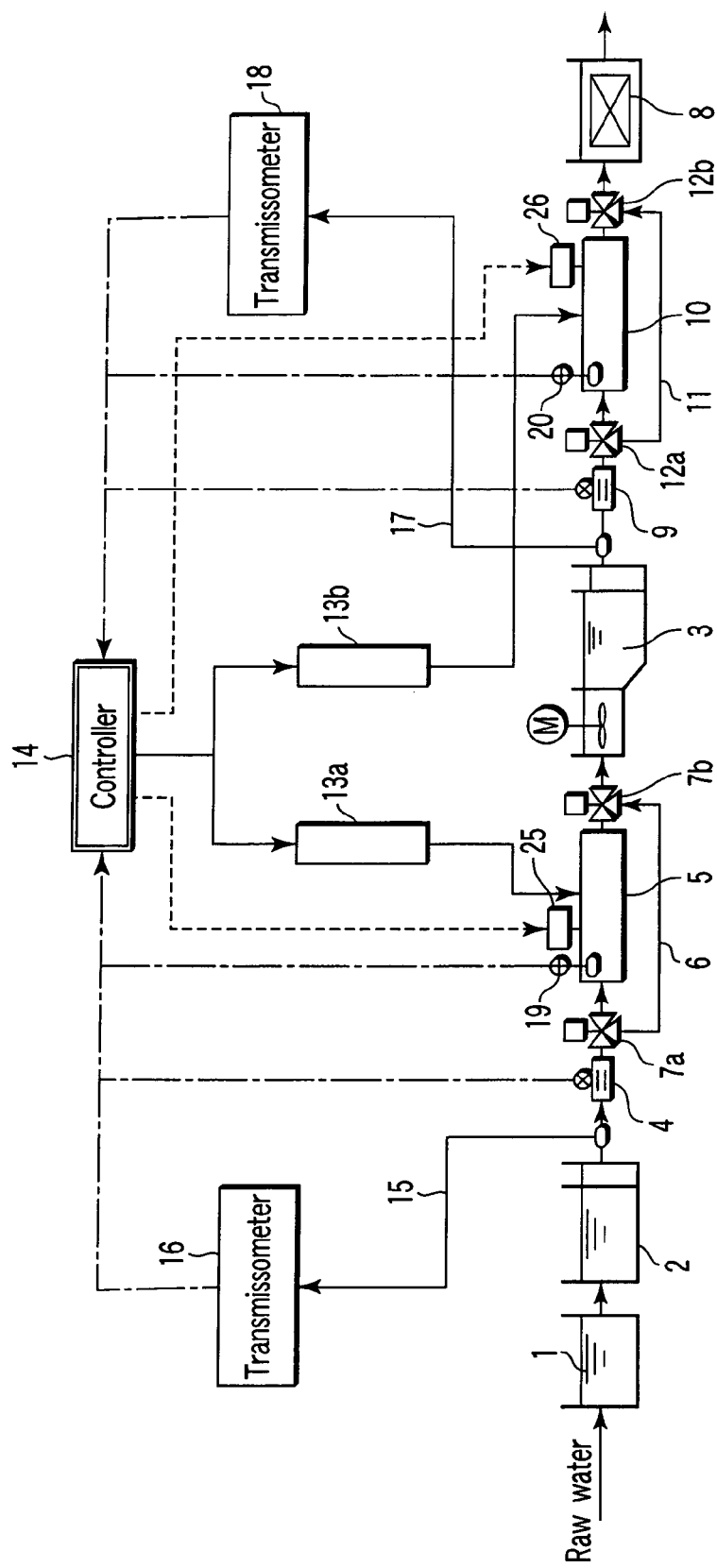
F I G. 6

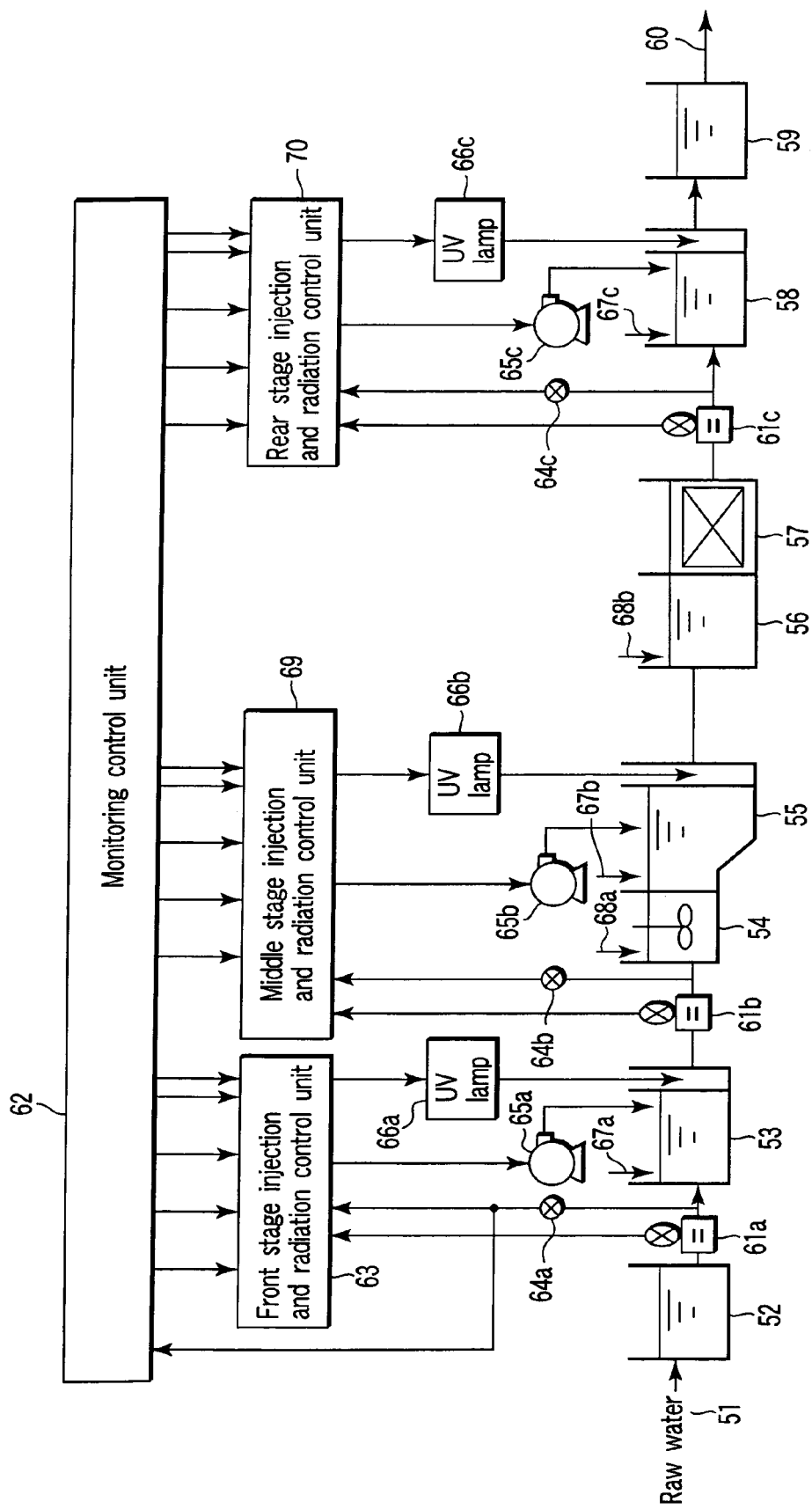
F I G. 8

Injection and radiation control pattern table

| Raw water turbidity | Front stage unit | Middle stage unit | Rear stage unit |
|---|---|---|---|
| High turbidity (10 or higher) | Sodium hypochlorite | Sodium hypochlorite | Sodium hypochlorite + UV |
| Middle turbidity (5 to 10) | UV + Sodium hypochlorite | UV | Sodium hypochlorite |
| Low turbidity (below 5) | UV | UV | Sodium hypochlorite + UV |

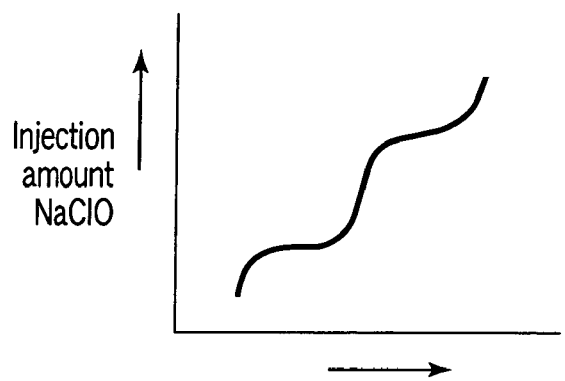
F I G. 13A
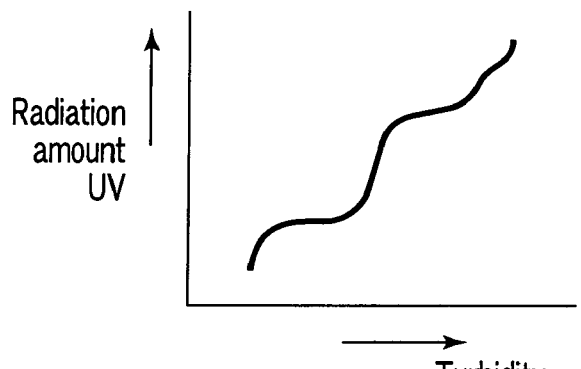
F I G. 13B
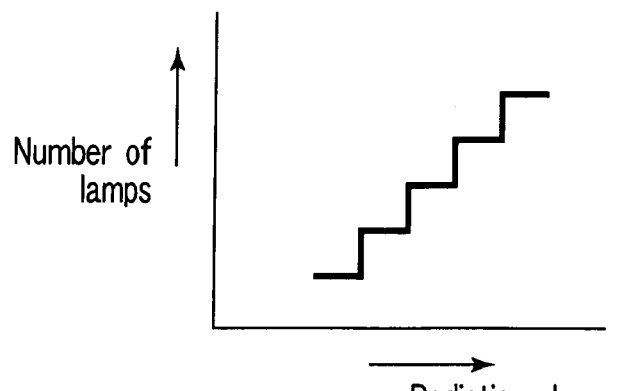
F I G. 13C

ULTRAVIOLET RADIATION WATER TREATMENT SYSTEM

CROSS-REFERENCE TO RELATED APPLICATIONS

This is a continuation of application Ser. No. 11/373,996, filed Mar. 14, 2006, which is incorporated herein by reference.

This application is based upon and claims the benefit of priority from prior Japanese Patent Applications No. 2005-095943, filed Mar. 29, 2005; and No. 2005-346147, filed Nov. 30, 2005, the entire contents of both of which are incorporated herein by reference.

BACKGROUND OF THE INVENTION

1. Field of the Invention

The present invention relates to an ultraviolet radiation water treatment system for performing a water purifying treatment by use of ultraviolet radiation.

2. Description of the Related Art

Conventionally, water treatment systems represented by water systems have been operated on the basis of ensuring hygiene by chlorine sterilization.

However, in recent years, there have occurred water system contamination accidents caused by emerging or reemerging pathogenic microbes such as cryptosporidium, giargia and the like.

Further, the mass generation of algae through eutrophication of lakes, dams, and rivers as water system water sources, and increasing pollution by organic matters and the like has caused abnormal odor and taste, coloring disorders, aggregation and deposition inhibition, filtration blockage, leakage into filtered water, and other problems.

Furthermore, there has occurred a problem where chlorine agents to be injected into water for sterilization react with organic matters in raw water, thereby generating harmful by-products such as trihalomethanes (It is the general term showing the total amount of Chloroform, Bromoform, Bromodichloromethane, and Dichlorochloromethane.).

These problems have come to a level not to be controlled by a prior-art water treatment system of the basic treatment process including aggregation and deposition, filtration, and chlorine treatment.

In such circumstances, a sterilization (disinfection) technology by an ultraviolet radiation treatment (hereinafter referred to also as ultraviolet disinfection) has attracted much attention as an alternative sterilization technology to the conventional chlorine sterilization. The ultraviolet disinfection has an advantage that it does not require complicated procedures of chemical injection, and does not generate harmful by-products. For this reason, in water treatment plants and the like, the ultraviolet radiation treatment is adopted in some cases for the purpose of sterilization and oxidation of residual organic matters. However, from the viewpoint of the transmittance efficiency of ultraviolet light, a treatment where ultraviolet light is radiated to filtered water or aggregated or deposited water is carried out in general.

On the other hand, in some cases, ultraviolet radiation is applied to raw water for the purpose of aggregation improvements, elimination of infectiousness of pathogenic microbes such as criptosporidium, and the like. This is a treatment where ultraviolet light is radiated in the place of performing a chlorine sterilization to raw water. As mentioned previously, unlike the chlorine treatment, this treatment does not generate by-products such as trihalomethanes even if ultraviolet light is radiated. Further, ultraviolet light is highly efficient to damage the reproductive power of criptosporidium and eliminate its infectiousness. Therefore, the ultraviolet radiation treatment is employed.

In the water purifying treatment, it is preferable that the reproduction of algae included in raw water is prevented, and it has been confirmed that the ultraviolet radiation treatment is also effective as a treatment to prevent the reproduction of algae.

Meanwhile, the radiation efficiency of ultraviolet light changes with the turbidity and chromaticity of water to be treated. Especially, it is difficult to control the water quality of raw water. Therefore, it is difficult to appropriately maintain the radiation efficiency in the ultraviolet radiation treatment, which has been a problem in the prior art.

In order to solve such a problem, there is proposed a technology for realizing an appropriate ultraviolet radiation control by detecting a turbidity of raw water, and controlling a flow rate of raw water that is made to flow through a water pipe containing an ultraviolet lamp according to the detected turbidity (refer to, for example, Jpn. Pat. Appln. KOKAI Publication No. 5-169059). In this document, it is proposed to use ultraviolet radiation in an algicidal treatment of water plankton in water storage basins and the like.

Further, there is also proposed a technology for realizing an appropriate ultraviolet radiation control by use of a particle meter in the place of a turbidity meter (refer to, for example, Shigeo Kimura et. al., "Investigation on Basic Performance Evaluation of Particle Measuring Devices", Water System Association Magazine, vol. 71, No. 10, pp. 31 to 51, October, 2002). Furthermore, there is proposed an ultraviolet radiation system that controls an output of an ultraviolet lamp by use of a turbidity meter and a particle meter in a system for radiating ultraviolet light into raw water in a water purifying treatment plant (refer to, for example, Jpn. Pat. Appln. KOKAI Publication No. 2004-188273).

In the ultraviolet radiation system and the ultraviolet radiation treatment method described in the above-described prior-art documents, there are problems as shown below.

In general, algae that cause problems in aggregation and deposition cannot be countermeasured only by radiating ultraviolet light into treated water after the aggregation and deposition treatment of raw water. Thus, in order to use the ultraviolet radiation effect as a countermeasure against algae, it is necessary to radiate ultraviolet light into raw water before the aggregation treatment.

However, the water quality of raw water changes greatly with water sources, fluctuations in meteorological phenomena, and the like. More specifically, the turbidity, the number of microbes, and the concentration of organic matter in raw water change greatly owing to the mass reproduction of algae and rainfalls, and in normal cases, the ultraviolet transmittance decreases as these values increase. As a result, the effect of the ultraviolet radiation cannot be attained sufficiently, and the effects of not only the algae countermeasures, but also the sterilization (disinfection) treatment of pathogens and the like decrease, which is another problem with the prior art.

BRIEF SUMMARY OF THE INVENTION

According to a first aspect of the present invention, there is provided a water treatment system for performing a water purifying treatment by use of ultraviolet radiation, comprising:

a first ultraviolet radiation device which radiates ultraviolet in a raw water coagulation/sedimentation treatment process as a front stage process of a water purifying treatment process;

a second ultraviolet radiation device to radiate ultraviolet to treatment water at the front stage process in a rear stage process of the water purifying treatment process; and a controller which controls the first and second ultraviolet radiation devices.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is a block diagram showing major portions of a water treatment system according to a third embodiment of the invention;

FIG. 8 is a schematic diagram showing a water treatment system according to a fourth embodiment of the invention and a water purifying plant to which the water treatment system is applied;

FIG. 13A is a graph showing the relation between the turbidity and sodium hypochlorite in the water treatment system according to the fourth embodiment;

FIG. 13B is a graph showing the relation between the turbidity and the ultraviolet injection and radiation amount in the water treatment system according to the fourth embodiment; and FIG. 13C is a graph showing the relation between the number of UV lamps and the designated radiation amount in the water treatment system according to the fourth embodiment.

DETAILED DESCRIPTION OF THE INVENTION

Embodiments of the present invention will be illustrated in more details with reference to the accompanying drawings hereinafter.

First Embodiment

Figure 1:
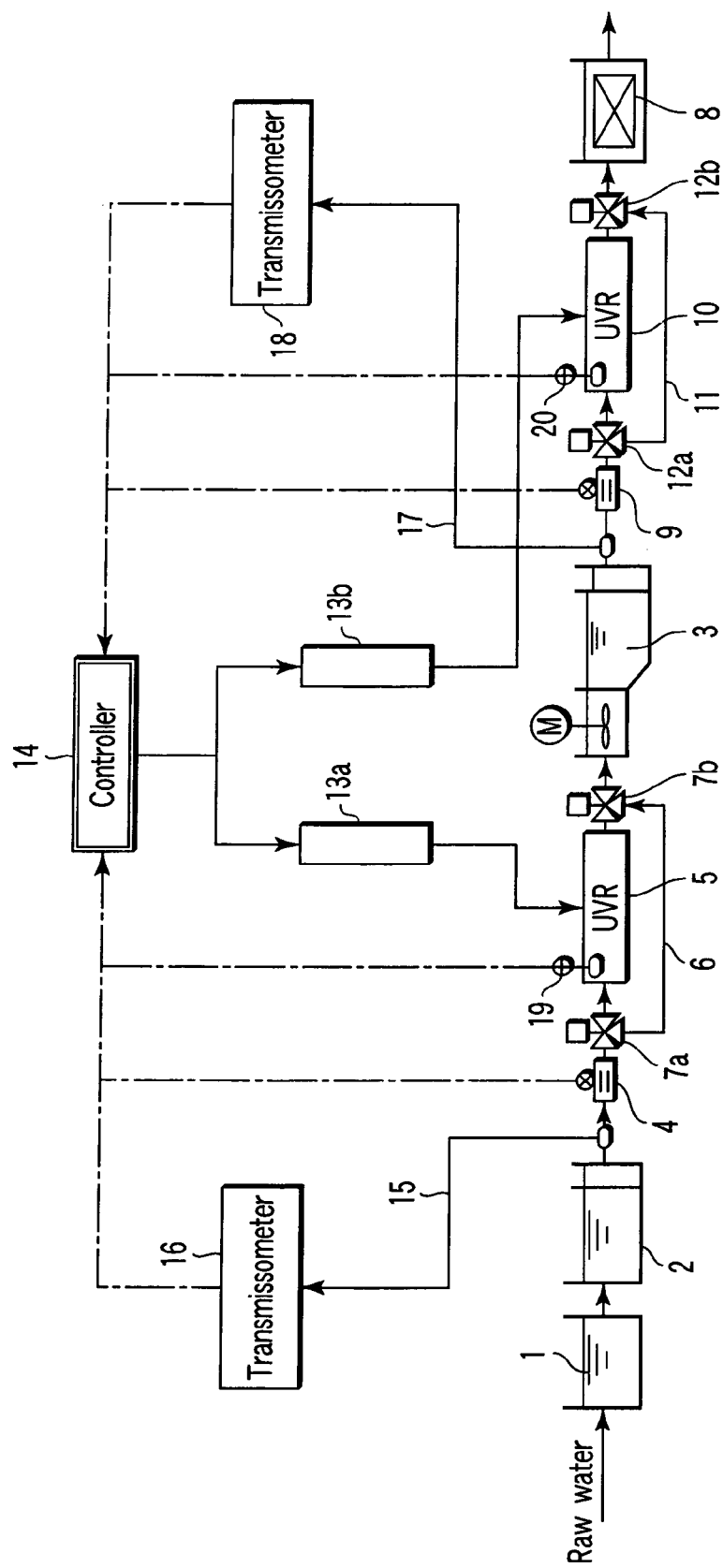
FIG. 1 is a block diagram showing major portions of a water treatment system according to a first embodiment of the invention.

FIG. 1 is a block diagram showing major portions of a water treatment system according to a first embodiment of the present invention.

The system has a sand basin 1 to which raw water pumped up through an intake (not shown) is guided through a water conduit pipe, and a water basin 2 which temporarily stores the raw water which is supplied from the sand basin 1. An amount of the raw water to be supplied to a water purifying process is adjusted by the water basin 2.

The system also has a coagulation/sedimentation basin 3 to guide the raw water supplied from the water basin 2 via a front stage treatment process. In the front stage treatment process, a raw water flow meter 4 and a first ultraviolet radiation device (hereinafter, referred to also as front stage ultraviolet radiation device) 5 are arranged on the way of pipes for supplying the raw water from the water basin 2 to the coagulation/sedimentation basin 3. Further, a bypass piping 6 is arranged for the raw water to take a roundabout route away from the front stage ultraviolet radiation device 5.

The bypass piping 6 is connected to the inlet side of the front stage ultraviolet radiation device 5 via an inlet three-way valve 7a, and is connected to the outlet side thereof via an outlet three-way valve 7b. The inlet three-way valve 7a and the outlet three-way valve 7b are valves for changing routes of the raw water, respectively. On the way of the piping, the water to which ultraviolet has been radiated by the front stage ultraviolet radiation device 5 is supplied to the coagulation/sedimentation basin 3.

In the coagulation/sedimentation basin 3, an aggregating agent is injected, and turbidity matters in the raw water are removed in the procedures of high speed stirring, low speed stirring, and deposition. More specifically, fine sands and dirts, and colloidal organic matters get together to form flocks, and turbidity matters are deposited and removed. At this moment, part of algae and pathogenic microbes dead or still alive after the ultraviolet radiation by the front stage ultraviolet radiation device 5 are also taken in flocks and removed.

Further, in this system, a sedimented water flow meter 9 and a second ultraviolet radiation device (hereinafter, referred to also as rear stage ultraviolet radiation device) 10 are arranged on the way of the piping for supplying treatment water from the coagulation/sedimentation basin 3 to a filter basin 8 in a rear stage treatment process as well. In addition, a bypass pipe 11 is arranged for the treatment water to take a roundabout route away from the rear stage ultraviolet radiation device 10.

The bypass pipe 11 is connected to the inlet side of the rear stage ultraviolet radiation device 10 via an inlet three-way valve 12a, and is connected to the outlet side thereof via an outlet three-way valve 12b. The inlet three-way valve 12a and the outlet three-way valve 12b are valves for changing routes of the raw water, respectively. On the way of the piping, the treatment water to which ultraviolet has been radiated by the front stage ultraviolet radiation device 5 is supplied to the filter basin 8.

In each inside of the front stage ultraviolet radiation device 5 and the rear stage ultraviolet radiation device 10, a plurality of ultraviolet lamps for radiating ultraviolet are arranged. Each of the ultraviolet lamps is supplied with electric power from ultraviolet lamp power sources 13a, 13b, and is lit.

A water purifying treatment monitor control device (hereinafter referred to as controller) 14 of the system is connected to the ultraviolet lamp power sources 13a, 13b via a control signal line, and controls the output of each of the ultraviolet lamp power sources 13a, 13b. Thereby, the amount of electric power supplied to each of the ultraviolet lamps of the ultraviolet radiation devices 5, 10 is adjusted.

To the controller 14, a measurement value of a raw water flow rate is input from the raw water flow meter 4, and a measurement value of a sedimented water flow rate is input from the sedimented water flow meter 9. Also, to the controller 14, an ultraviolet transmittance of the raw water measured by a raw water ultraviolet transmissometer 16 is input, and an ultraviolet transmittance of the sedimented water measured by a sedimented water ultraviolet transmissometer 18 is input.

The raw water ultraviolet transmissometer 16 is connected to a raw water sampling pipe 15, and measures an ultraviolet transmittance of a raw water sample taken up by the raw water sampling pipe 15 from a piping for connecting the water basin 2 and the front stage ultraviolet radiation device 5. On the other hand, the sedimented water ultraviolet transmissometer 18 is connected to a sedimented water sampling pipe 17, and measures an ultraviolet transmittance of a sedimented water sample taken up by the sedimented water sampling pipe 17 from a piping for connecting the coagulation/sedimentation basin 3 and the rear stage ultraviolet radiation device 10.

Moreover, ultraviolet illuminance meters 19, 20 for sensing the illuminance of an arbitrary point in the inside are arranged, respectively, to the front stage ultraviolet radiation device 5 and the rear stage ultraviolet radiation device 10. Measurement values from these ultraviolet illuminance meters 19, 20 are input to the controller 14.

(Operation and Effects of First Embodiment)

Hereinafter, the operation and effects of the present embodiment will be explained.

The controller 14 calculates the respective ultraviolet illuminances in the insides of the front stage ultraviolet radiation device 5 and the rear stage ultraviolet radiation device 10 by use of the following equation (1). Herein, the ultraviolet illuminance is maximum at the surface of the ultraviolet lamp, and decreases gradually away from the lamp. The decrease amount at this moment is calculated with an ultraviolet transmittance to a fluid to be treated (raw water or sedimented water) flowing in the piping, and a distance from the lamp surface:

$$I = \left(\frac{U_V}{4\pi Z_0^2}\right) \times \exp\left(\ln\left(\frac{T}{100}\right) \times Z\right) \quad (mW/cm^2) \quad (1)$$

where I means an ultraviolet illuminance (mW/cm$^2$); $U_V$ means an ultraviolet output of the lamp (mW); T means an ultraviolet transmittance (%), $Z_0$ means a distance from the lamp (cm); and Z means a distance in which ultraviolet penetrates the raw water or the treatment water (cm).

Meanwhile, measurement values of the ultraviolet transmittance are input to the controller 14 from the raw water ultraviolet transmissometer 16 and the sedimented water ultraviolet transmissometer 18.

The performance of algicidal treatment and sterilization (disinfection) by ultraviolet radiation with the front stage ultraviolet radiation device 5 and the rear stage ultraviolet radiation device 10 is determined by an ultraviolet amount based on an illuminance that microbes included in the raw water or the treatment water flowing in the piping receive, and time. In general, the ultraviolet amount is defined by the following equation (2):

$$\text{Dose} = I \times t \quad (mJ/cm^2) \quad (2)$$

where Dose means an ultraviolet amount (mJ/cm$^2$); I means an ultraviolet illuminance (mW/cm$^2$), and t means a radiation time (s).

Further, an ultraviolet amount necessary to deaden microbes to be treated or inactivate the same (destroy the reproductive power, or destroy the infectious power in the case of pathogenic microbes) differs generally depending on the kinds of microbes. Accordingly, it is necessary to take into consideration the performances of the ultraviolet radiation devices 5, 10 according to the kinds of microbes to be treated.

(Control of Front Stage Ultraviolet Radiation Device 5)

In the present embodiment, the front stage ultraviolet radiation device 5 is arranged in the front stage of the coagulation/sedimentation basin 3. Therefore, it is effective as countermeasures against not merely pathogenic microbes living in the raw water but also algae. Accordingly, the controller 14 controls the output of the ultraviolet lamps of the front stage ultraviolet radiation device 5 in order to attain the radiation of the ultraviolet amount necessary to deaden or inactivate a plurality of pathogenic microbes and algae.

The controller 14 controls the output of the ultraviolet lamps of the front stage ultraviolet radiation device 5 in consideration of the measurement value by the raw water ultraviolet transmissometer 16, the measurement value by the raw water flow meter 4, the arrangement of the ultraviolet lamps in the front stage ultraviolet radiation device 5, and the raw water flowing condition that changes depending on the internal structure and the flow rate, by use of the arithmetic equations such as the above arithmetic equations (1) to (2). More specifically, the controller 14 calculates a necessary ultraviolet output value according to the ultraviolet transmittance and the flow rate change by the arithmetic equations. Thereby, the controller controls the electric power to be supplied from the ultraviolet lamp power source 13a to the ultraviolet lamps in the front stage ultraviolet radiation device 5.

Further, when the controller 14 determines that the ultraviolet transmittance of the raw water is sufficiently high in comparison with a reference value on the basis of the measurement value from the raw water ultraviolet transmissometer 16, the controller makes a control to decrease the output of the ultraviolet lamps of the rear stage ultraviolet radiation device 10 to the lower limit value, or stop the operation.

Namely, when the ultraviolet transmittance of the raw water is high, it is possible to attain the sufficient algicidal treatment and sterilization (disinfection) performance even with only the front stage ultraviolet radiation device 5. Accordingly, by decreasing the performance of the rear stage ultraviolet radiation device 10, it is possible to save the electricity consumption. In this case, from the viewpoint of the characteristics of the ultraviolet lamp, a constant wait time is required for the ultraviolet lamp to be lit and perform its ultraviolet output stably. For this reason, the output decrease operation is preferable to stopping the operation of the rear stage ultraviolet radiation device 10.

On the other hand, the ultraviolet transmittance is subject to influences by floating matters, turbidity matters and dissolved organic matters in the raw water. For this reason, when the raw water turbidity increases owing to rainfalls and the like, the ultraviolet transmittance decreases greatly. In such a case, the controller 14 makes a control to stop the operation of the front stage ultraviolet radiation device 5, or to decrease the output of the ultraviolet lamps to the lower limit value. This is because when the ultraviolet transmittance decreases greatly, the necessary ultraviolet amount may not be obtained even with the maximum radiation of the front stage ultraviolet radiation device 5 in some cases, and there is a high possibility that the electric power charged to the front stage ultraviolet radiation device 5 may be wasted.

In this case, the controller 14 makes control to change flow routes by operating the three-way valves 7a, 7b to cause the raw water to flow in the bypass piping 6 in order to prevent the piping inside from becoming dirty owing to the deposition of floating matters and turbidity matters and the attachment of organic matters. Further, the controller 14 increases the output of the rear stage ultraviolet radiation device 10 over a standard value, and compensates the loss of the sterilization (disinfection) performance of microbes in the front stage process.

(Control of Rear Stage Ultraviolet Radiation Device 10)

Next, a method of controlling a radiation amount of the rear stage ultraviolet radiation device 10 will be explained hereinafter.

The rear stage ultraviolet radiation device 10 is arranged at the rear stage of the coagulation/sedimentation basin 3, and radiates ultraviolet light into sedimented water as treatment water. Part of floating matters and turbidity matters, and algae and pathogenic microbes in the raw water are taken into flocks and deposited, and are removed as polluted sludge. However, organic matters dissolved in the water cannot be removed by the coagulation/sedimentation process performed at 3. Therefore, they are left as ultraviolet absorbing factors in the rear stage ultraviolet radiation device 10.

The controller 14 controls the output of the ultraviolet lamps in the rear stage ultraviolet radiation device 10 in order to obtain a radiation by the ultraviolet amount necessary to deaden or inactivate plural microbes left after the coagulation/sedimentation process.

The controller 14 controls the output of the ultraviolet lamps of the rear stage ultraviolet radiation device 10 in consideration of the ultraviolet transmittance of the sedimented water by the sedimented water ultraviolet transmissometer 18, the flow rate measurement value by the sedimented water flow meter 9, an ultraviolet illuminance distribution defined by the arrangement of the ultraviolet lamps in the rear stage ultraviolet radiation device 10, and the flowing condition that changes depending on the flow route structure and the flow rate, by use of the arithmetic equations such as the above arithmetic equations (1) to (2). More specifically, the controller 14 calculates a necessary ultraviolet output value according to the ultraviolet transmittance and the flow rate change by the arithmetic equations. Thereby, the controller controls the electric power supplied from the ultraviolet lamp power source 13b to the ultraviolet lamps in the rear stage ultraviolet radiation device 10.

In brief, the system according to the present embodiment controls and performs the ultraviolet radiation treatment by the front stage ultraviolet radiation device 5 at the front stage process, and the ultraviolet radiation treatment by the rear stage ultraviolet radiation device 10 at the rear stage process, respectively. Accordingly, by the ultraviolet radiation effect at the front stage process, the treatment to make the microbes including algae and the like inactive or harmless is realized, and by the ultraviolet radiation effect at the rear stage process, the treatment to make the microbes left still after the coagulation/sedimentation process dead or inactive is realized.

Consequently, in water treatment systems especially of water systems and the like, it is possible to attain the ultraviolet radiation effect, and thereby perform the countermeasures against algae and the sterilization (disinfection) treatment of pathogenic microbes and the like safely and securely. Further, in the system according to the present embodiment, it is possible to reduce greatly the use amount of chlorine agents injected in the water purifying treatment process in the prior art. As a result, it is possible to prevent the occurrence of harmful by-product matters such as trihalomethanes generated in the course of the sterilization with chlorine agents. Furthermore, it is also possible to reduce the costs required for the injection of chlorine agents.

Second Embodiment

Figure 2:
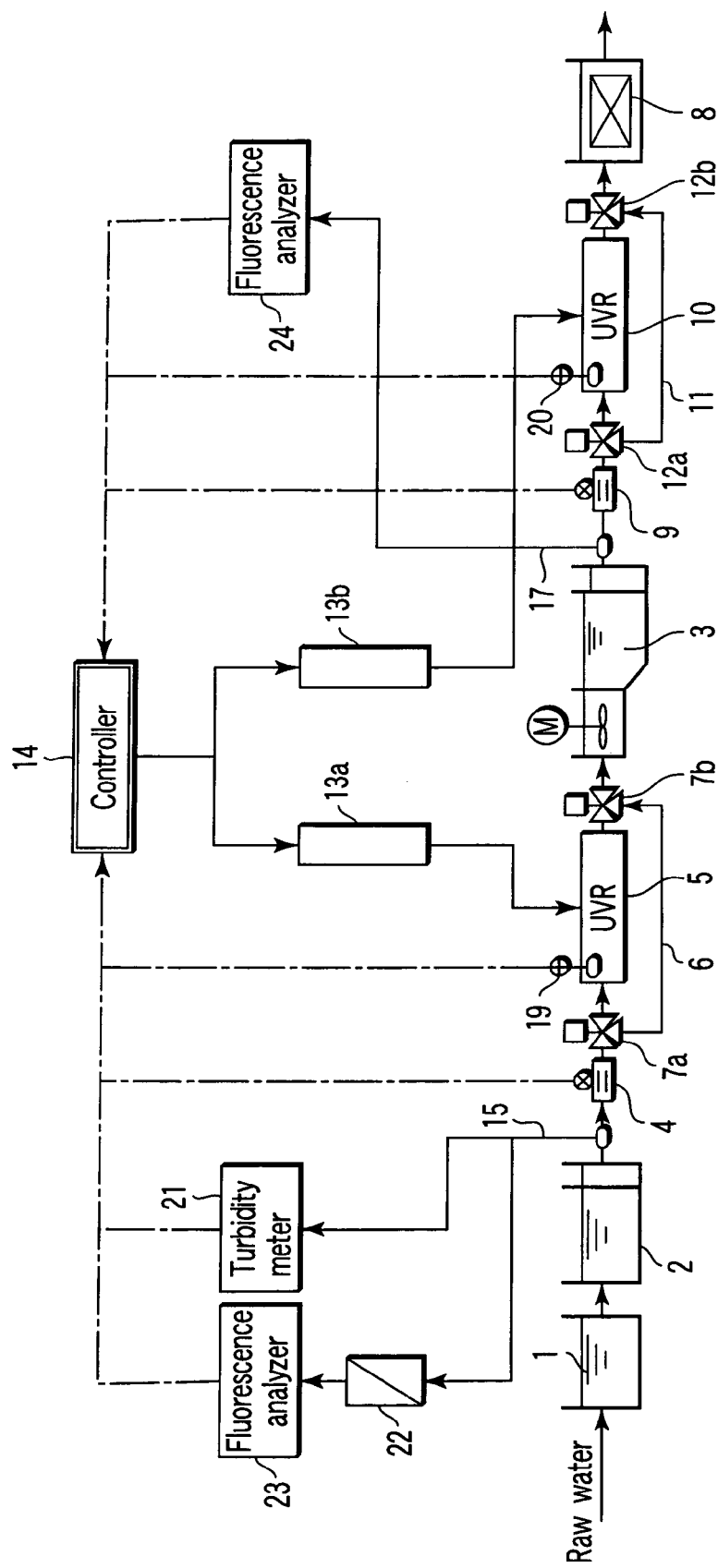
FIG. 2 is a block diagram showing major portions of a water treatment system according to a second embodiment of the invention.

FIG. 2 is a block diagram showing major portions of a water treatment system according to a second embodiment of the invention.

The system according to the present embodiment has a raw water turbidity meter 21 and a raw water fluorescence analyzer 23 as raw water ultraviolet transmittance measuring devices, and also has a sedimented water fluorescence analyzer 24 as a sedimented water ultraviolet transmittance measuring device. Meanwhile, the same functional components as those of the system according to the first embodiment shown in FIG. 1 are denoted by the same reference numerals, and the detailed description thereof is omitted.

In the system according to the present embodiment, a turbidity of raw water measured by the raw water turbidity meter 21 is input to a controller 14, and a fluorescence intensity of raw water measured by the raw water fluorescence analyzer 23 is also input to the controller 14. Further, a fluorescence intensity of sedimented water measured by the sedimented water fluorescence analyzer 24 is input to the controller 14.

The raw water turbidity meter 21 measures a turbidity of a raw water sample taken up by a raw water sampling pipe 15. Herein, the raw water sampling pipe 15 is connected to a piping for connecting a water basin 2 and a front stage ultraviolet radiation device 5.

The raw water fluorescence analyzer 23 measures a fluorescence intensity of a raw water sample taken up by the raw water sampling pipe 15 and filtered by a filtration device 22.

On the other hand, the sedimented water fluorescence analyzer 24 measures the fluorescence intensity of a sedimented water sample taken up by a sedimented water sampling pipe 17. Herein, the sedimented water sampling pipe 17 is connected to a piping between a coagulation/sedimentation basin 3 and a rear stage ultraviolet radiation device 10.

Meanwhile, in the raw water fluorescence analyzer 23, it is necessary to remove turbidity matters in order to precisely measure dissolved organic matters in raw water. Therefore, the filtration device 22 is arranged at the front stage of the raw water fluorescence analyzer 23 to thereby remove turbidity matters in raw water. Conversely, with regard to the sedimented water measured by the sedimented water fluorescence analyzer 24, turbidity matters are removed at the coagulation/sedimentation basin 3, and thus, there is no need for arranging a filtration device.

(Operation and Effects of Second Embodiment)

Hereinafter, the operation and effects of the present embodiment will be explained with reference to FIGS. 2 and 3 to 5.

In general, when ultraviolet penetrates water, the ultraviolet intensity is attenuated by the absorption and scattering of turbidity matters such as particles floating in water, the absorption by organic matters dissolved in water, and the like. More specifically, the ultraviolet intensity decreases as ultraviolet goes away from the radiation surface. The ultraviolet transmittance (%) shows a ratio of ultraviolet penetrating a clearance of 1 cm. Herein, examples of a device for measuring the ultraviolet transmittance include the ultraviolet transmissometers 16, 18 as shown in FIG. 1.

However, a general ultraviolet transmissometer has a configuration for putting sample water in a quartz glass standard cell to measure an ultraviolet transmittance in batch, or a configuration for causing sample water to flow in a quartz glass cell and measuring an ultraviolet transmittance in real time. In the configuration for measuring in batch, it is impossible to set the ultraviolet transmittance as a control index of the ultraviolet lamp output. Further, in the configuration for causing sample water to flow, it is impossible to correctly measure the ultraviolet transmittance owing to dirt on the surface of the quartz glass cell.

The system according to the present embodiment has a configuration in which the ultraviolet transmittance is estimated on the basis of measurement results of the turbidity of raw water and the concentration of dissolved organic matters without using a general ultraviolet transmissometer.

The ultraviolet transmittance is composed of attenuation components owing to the absorption and scattering by turbidity matters floating in water, and attenuation components owing to the absorption of organic matters dissolved in water. Accordingly, by measuring the turbidity of raw water and the concentration of dissolved organic matters, the ultraviolet transmittance can be estimated.

Figure 3:
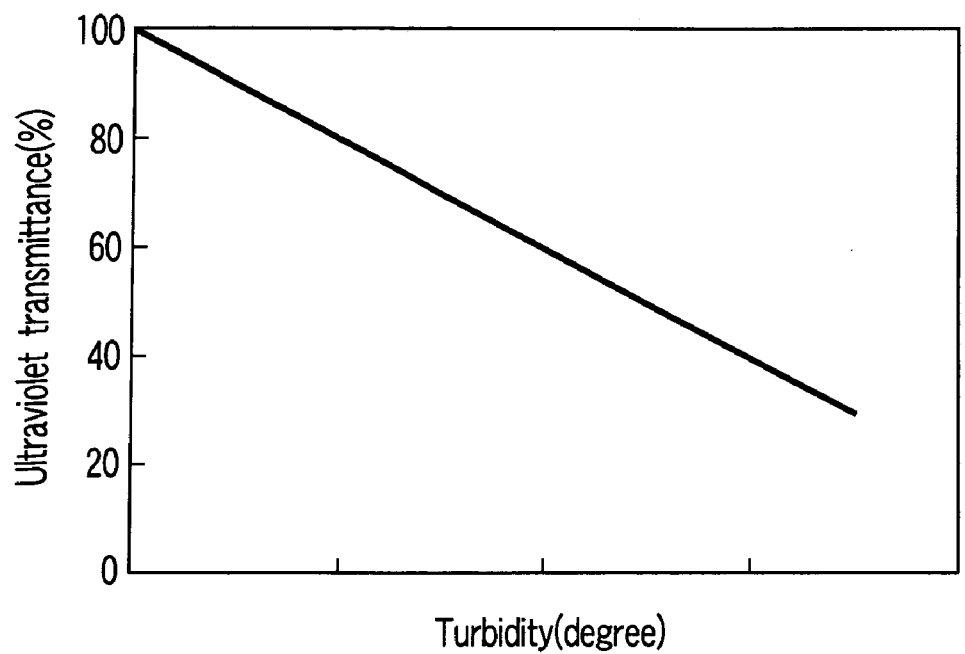
FIG. 3 is a graph showing the relation between the turbidity and the ultraviolet transmittance according to the second embodiment.

FIG. 3 is a graph showing the relation between the turbidity of raw water, and the ultraviolet transmittance in the case of considering only influences by the absorption and scattering owing to turbidity components. As shown in FIG. 3, there is a correlation between the turbidity and the ultraviolet transmittance, and a relation as shown in the following equation (3) is established:

$$T_{tu} = f(tu) \, (\%) \tag{3}$$

where $T_{tu}$ means an ultraviolet transmittance (%) in the case where ultraviolet absorption/scattering manners are only turbidity matters, and tu means a turbidity (degree).

Further, there is ultraviolet absorbance as an index showing absorption by dissolved organic matters in water. The relation between the ultraviolet absorbance and the ultraviolet transmittance is defined by the following equation (4):

$$\alpha_{oc} = -\ln(T_{oc}/100) \tag{4}$$

where $\alpha_{oc}$ means an ultraviolet absorbance, and $T_{oc}$ means an ultraviolet transmittance (%) in the case of considering only absorption by dissolved organic matters. Accordingly, measuring the ultraviolet absorbance enables to obtain the ultraviolet transmittance.

Figure 4:
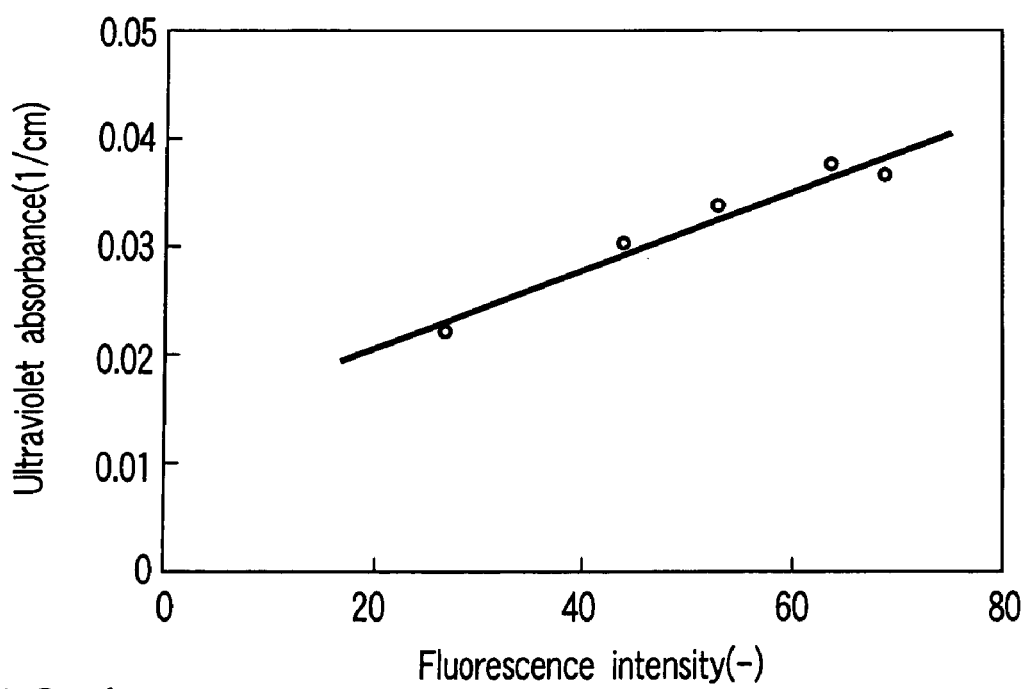
FIG. 4 is a graph showing the relation between the fluorescence intensity and the ultraviolet absorbance according to the second embodiment.

The controller 14 according to the present embodiment inputs a fluorescence intensity of raw water measured by the raw water fluorescence analyzer 23 and thereby calculates an ultraviolet absorbance, and estimates the concentration of dissolved organic matters in raw water from the ultraviolet absorbance (refer to FIG. 4).

FIG. 4 is a graph showing the result of a measurement of the relation between a fluorescence intensity of a fluorescence wavelength 425 nm that generates in response to an excitation wavelength 345 nm and an ultraviolet absorbance by use of river water. As shown in FIG. 4, there is a linear correlation between the fluorescence intensity (excitation wavelength 345 nm, fluorescence wavelength 425 nm) and the ultraviolet absorbance (wavelength 253.7 nm).

Figure 5:
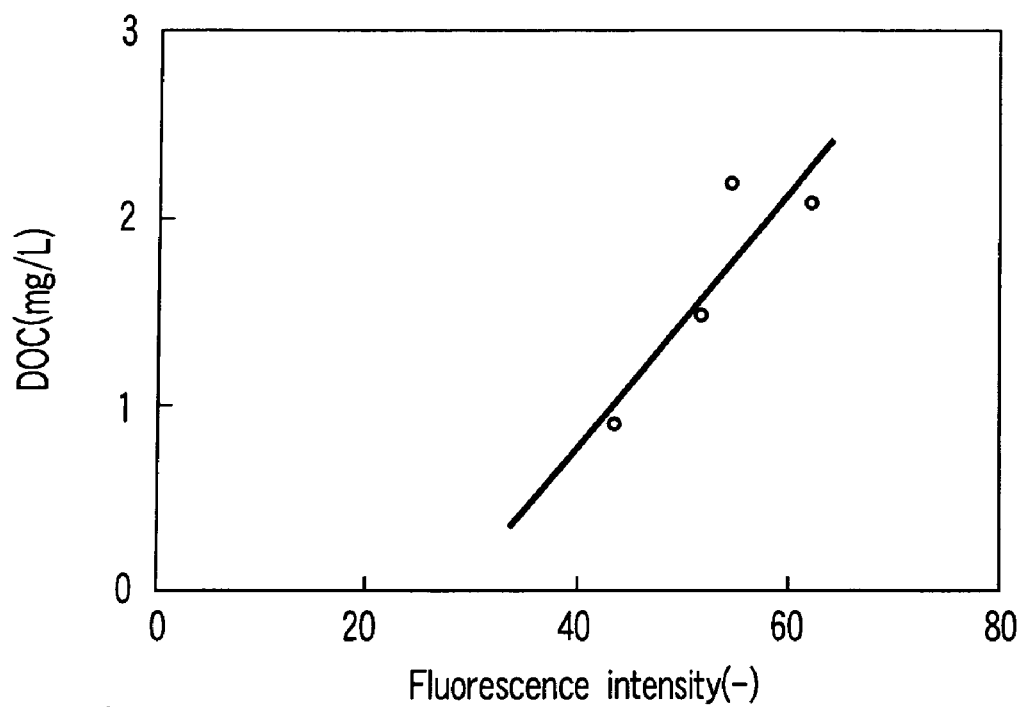
FIG. 5 is a graph showing the relation between the fluorescence intensity and the carbon concentration of dissolved organic matters according to the second embodiment.

It has been confirmed that the concentration of dissolved organic carbon (DOC) as an index of the concentration of dissolved organic matters and the fluorescence intensity at this moment has an extremely strong correlation, as shown in FIG. 5. From this fact, by measuring the fluorescence intensity with the raw water fluorescence analyzer 23, the ultraviolet transmittance $T_{oc}$ (the value in the case of considering only the absorption by dissolved organic matters) can be calculated from the relation between FIG. 4 and the above equation (4), as shown in the following equation (5):

$$T_{oc} = 100 \times \exp(-c \times FL) \, (\%) \tag{5}$$

where c means a coefficient, and FL means a fluorescence intensity.

From the above, the total ultraviolet transmittance T in consideration of the absorption and scattering by the turbidity matter and dissolved organic matters in raw water can be obtained by the following equation (6).

$$T = T_{tu} + T_{oc} \, (\%) \tag{6}$$

The controller 14 calculates the ultraviolet transmittance of raw water by use of the raw water turbidity measured by the raw water turbidity meter 21, and the fluorescence intensity measured by the raw water fluorescence analyzer 23. As explained in the above-described first embodiment, the controller 14 controls the output of the ultraviolet lamps of the front stage ultraviolet radiation device 5 on the basis of the ultraviolet transmittance of raw water. Consequently, unwasted and appropriate electric power is supplied to the front stage ultraviolet radiation device 5, whereby it is possible to realize a complete algicidal effect of algae and sterilization (disinfection) of pathogenic microbes from raw water.

Further, in the same manner as in the first embodiment, the ultraviolet transmittance is subject to influences by floating matters, turbidity matters and dissolved organic matters in the raw water. For this reason, when the raw water turbidity increases owing to rainfalls and the like, the ultraviolet transmittance decreases greatly. In such a case, the controller 14 makes a control to stop the operation of the front stage ultraviolet radiation device 5, or to decrease the output of the ultraviolet lamps to the lower limit value. In this case, the controller 14 makes a control to change flow routes by operating the three-way valves 7a, 7b to cause the raw water to flow in the bypass piping 6 in order to prevent the piping inside from becoming dirty owing to the deposition of floating matters and turbidity matters and the attachment of organic matters. Moreover, the controller 14 increases the output of the rear stage ultraviolet radiation device 10 over a standard value, and compensates the loss of the sterilization (disinfection) performance of microbes in the front stage process.

Next, a method of controlling the rear stage ultraviolet radiation device 10 will be explained hereinafter.

The rear stage ultraviolet radiation device 10 is arranged at the rear stage of the coagulation/sedimentation basin 3, and radiates ultraviolet to sedimented water as treatment water. In this case, turbidity matters have been removed from the treatment water. Therefore, the controller 14 can calculate the ultraviolet transmittance of the sedimented water from the relation of the above equation (5) on the basis of the fluorescence intensity measured by the deposition fluorescence analyzer 24.

Accordingly, the controller 14 controls the output of the ultraviolet lamps so as to secure the necessary ultraviolet amount in the rear stage ultraviolet radiation device 10 on the basis of the ultraviolet transmittance of the sedimented water and the flow rate measured by the sedimented water flow meter 9. Consequently, it is possible to precisely perform the sterilization of pathogenic microbes. Further, wasted electricity consumption can be prevented.

Third Embodiment

FIG. 6 is a block diagram showing major portions of a water treatment system according to a third embodiment of the invention.

The system according to the present embodiment relates to an ultraviolet radiation control using ultraviolet illuminance meters 19, 20 arranged in a front stage ultraviolet radiation device 5 and a rear stage ultraviolet radiation device 10, respectively. Meanwhile, the same functional components as those of the system according to the first embodiment shown in FIG. 1 are denoted by the same reference numerals, and the detailed description thereof is omitted.

As shown in FIG. 6, the system according to the present embodiment has the ultraviolet illuminance meters 19, 20 arranged in the front stage ultraviolet radiation device 5 and the rear stage ultraviolet radiation device 10, respectively. Respective measurement results from the ultraviolet illuminance meters 19, 20 are input to a controller 14.

Figure 7:
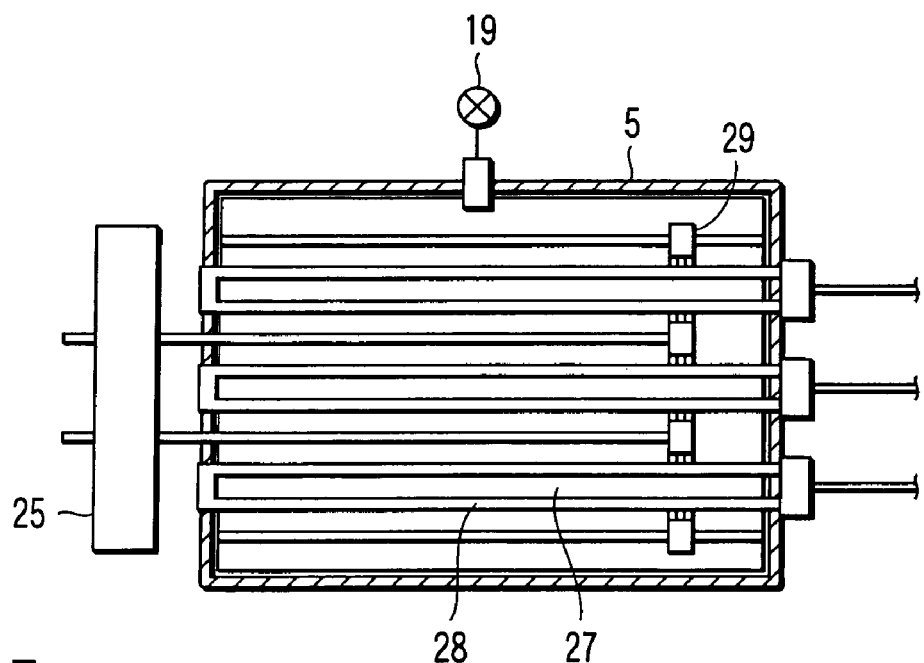
FIG. 7 is a diagram showing an internal configuration of a front stage ultraviolet radiation device according to the third embodiment.

FIG. 7 is a diagram showing an internal configuration of the front stage ultraviolet radiation device 5 for use in the system according to the embodiment, and shows a case where ultraviolet lamps 27 are arranged in the direction perpendicular to the flow direction of treatment water. Meanwhile, the internal configuration is also same in the case of the rear stage ultraviolet radiation device 10.

Herein, the front stage ultraviolet radiation device 5 and the rear stage ultraviolet radiation device 10, as shown in FIG. 7, have a plurality of ultraviolet lamps 27 therein, and also have ultraviolet lamp protective tubes 28 made of quartz glass for protecting the respective ultraviolet lamps 27. Further, the front stage ultraviolet radiation device 5 and the rear stage ultraviolet radiation device 10 have cleaning brush members 29 for cleaning the protective tubes 28. The cleaning brush member 29 is driven by a cleaning driving device 25 (however, a cleaning driving device 26 in the rear stage ultraviolet radiation device 10). The cleaning driving devices 25, 26 are controlled by the controller 14.

The controller 14 according to the embodiment is configured so as to perform an output control of the respective ultraviolet lamps 27 in the ultraviolet radiation devices 5, 10 by use of the ultraviolet illuminance meters 19, 20, an operation control of the cleaning brush members 29 of the ultraviolet lamp protective tubes 28, and performance monitoring of the ultraviolet lamps 27. These operations will be specifically explained hereinafter.

(Output Control of Ultraviolet Lamps 27)

The controller 14 controls the output of the ultraviolet lamps 27 built in the front stage ultraviolet radiation device 5 by means of the control method explained in the above-described first or second embodiment. Herein, when a measurement value is input to the controller 14 from the ultraviolet illuminance meter 19, an ultraviolet illuminance in the inside of the front stage ultraviolet radiation device 5 can be always monitored.

On the other hand, an ultraviolet amount target value $Dose_{targ}$ necessary to deaden or inactivate microbes to be treated (algae or pathogenic microbes, etc.) is preset (stored) in the controller 14. Further, in the controller 14, an arithmetic equation (7) for calculating a retention time t from a measurement value $F_R$ Of the raw water flow meter 4 and the flow route structure of the front stage ultraviolet radiation device 5 is set, and an arithmetic equation (8) for calculating an ultraviolet amount target value $I_{targ}$ at the set position of the ultraviolet illuminance meter 19 from the ultraviolet amount target value $Dose_{targ}$ and the retention time t is set:

$$t=(S\times L)/F_R (s) \quad (7)$$

where $F_R$ is a measurement value (m³/s) by the raw water flow meter; S is a representative flow route cross sectional area (m²); and L is a representative flow route length (m):

$$I_{targ}=C_t\times(Dose_{targ}/t) \; (mW/cm_2) \quad (8)$$

where $C_t$ is a correction coefficient, which is determined by the relation of an equation (9) on the basis of a positional relation constant $K_t$ of the ultraviolet illuminance meter 19 and the ultraviolet lamp 27, and a measurement value $T_R$ by the raw water ultraviolet transmissometer 16.

$$C_t=K_t\times f(T_R) \quad (9)$$

The controller 14 compares "$I_{meas}$" and "$I_{targ}$" by use of the above arithmetic equation (8) and a measurement value $I_{meas}$ by the ultraviolet illuminance meter 19. When the comparison result is "$I_{meas}<I_{targ}$", the controller 14 controls so as to increase the output of the ultraviolet lamp 27. When the comparison result is "$I_{meas}>I_{targ}$", the controller 14 controls so as to decrease the output of the ultraviolet lamp 27.

Meanwhile, the controller 14 performs the same output control also to the ultraviolet lamps 27 of the rear stage ultraviolet radiation device 10.

(Cleaning Control of Ultraviolet Lamp Protective Tubes and Radiation Performance Monitoring of Ultraviolet Lamps)

The controller 14 according to the embodiment has set therein: an arithmetic equation (10) for calculating an ultraviolet illuminance $I_O$ at the surface of the ultraviolet lamp protective tube 28 at the time of the output of the ultraviolet lamp 27; an arithmetic equation (11) for calculating an ultraviolet illuminance $I_{m0}$ at the surface of the ultraviolet lamp protective tube 28 from the measurement value $I_{meas}$ by the ultraviolet illuminance meter 19; and an allowable value $\Delta I_f$ of a difference between $I_0$ and $I_{m0}$ "$\Delta I=I_0-I_{m0}$":

$$I_0=\eta_{UV}\times w/W \; (mW/cm^2) \quad (10)$$

provided that $\eta_{UV}=f(w)$ where W means an ultraviolet lamp constant input electricity (W); w means an ultraviolet lamp input electricity set value (W); and $\eta_{UV}$ means an ultraviolet output efficiency (%)

$$I_{m0}=f(K_{m0}, I_{meas}, T_R) \; (mW/cm^2) \quad (11)$$

where $K_{m0}$ is a constant determined by the positional relation between the ultraviolet lamp 27 and the ultraviolet illuminance meter 19; $I_{meas}$ means a measurement value (mW/cm²) by the ultraviolet illuminance meter 19; and $T_R$ means a raw water ultraviolet transmittance (%).

The controller 14 compares the difference between $I_0$ and $I_{m0}$ "difference $\Delta I=I_0-I_{m0}$" calculated by the above arithmetic equations (10) and (11) with "$\Delta I_f$". When the comparison result is "$\Delta I \geq \Delta I_f$", the controller 14 controls the cleaning driving device 25 so as to operate the cleaning brush 29 of the ultraviolet lamp protective tube 28.

Next, the operation of radiation performance monitoring of the ultraviolet lamp will be explained.

The ultraviolet generation efficiency of the ultraviolet lamp 27 decreases with time according to an individual lamp characteristic. Therefore, it is necessary to exchange the ultraviolet lamps periodically. Thus, when the controller 14 determines that there has occurred deterioration exceeding the allowable range with the ultraviolet lamp 27, the controller makes a control to output a display so as to display prompting exchange of the ultraviolet lamps 27 from a display device or the like.

More specifically, a surface illuminance initial value $I_{ini}$ of the ultraviolet lamp protective tube 28, and an allowable value $\Delta I_{ini}$ of the lamp performance decrease are set in the controller 14. Immediately after operating the cleaning brush member 29 of the ultraviolet lamp protective tube 28, the controller 14 calculates the surface ultraviolet illuminance $I_{m0}$ of the ultraviolet lamp protective tube 28 from the measurement value $I_{meas}$ by the ultraviolet lamp illuminance meter 19 by use of the above arithmetic equation (11). The controller 14 compares the difference between the calculated value and the preset initial illuminance $I_{ini}$ "$\Delta Ic = I_{ini} - I_{m0}$" with the allowable value $\Delta I_{ini}$ of the lamp performance decrease. When the comparison result is "$\Delta I_C > \Delta I_{ini}$", the controller performs a display output to prompt to exchange the ultraviolet lamps 27.

Immediately after the exchange of the ultraviolet lamps 27, it must be that "$\Delta I_C = 0$". However, there is actually unevenness in the initial performance of the ultraviolet lamp 27, and thus, the performance allowable value of a new lamp is set $\Delta I_{ini,0}$. In addition, when the comparison result immediately after the exchange of the ultraviolet lamps 27 is "$\Delta I_C > \Delta I_{ini,0}$", the controller 14 gives an alarm informing of an error with the protective tube 28, the deterioration of the cleaning brush 29, a fault with other devices, and the like. Further, the controller performs a display output to display a message prompting to do a comprehensive maintenance including exchange of the protective tubes 28 and exchange of the cleaning brushes 29.

Meanwhile, the controller 14 performs the same monitoring control also to the ultraviolet lamps 27 of the rear stage ultraviolet radiation device 10.

In short, according to the system of the present embodiment, it is possible to judge the excess and deficiency of the ultraviolet amount on the basis of the respective measurement values by the ultraviolet illuminance meters 19, 20 arranged in the front stage ultraviolet radiation device 5 and the rear stage ultraviolet radiation device 10, and to correct and control the output of the ultraviolet lamps 27 by feedback. Moreover, by monitoring the dirt condition on the surface of the ultraviolet lamp protective tube 28, and monitoring the decrease of the ultraviolet generation efficiency of the ultraviolet lamps 27, it is possible to perform the operation control of the cleaning brush member 29 of the ultraviolet lamp protective tube 28, and the lamp maintenance support. As a consequence, it is possible to realize a water treatment system that automatically performs the maintenance of a stable ultraviolet radiation performance, and the maintenance of the ultraviolet radiation devices 5, 10.

Fourth Embodiment

FIG. 8 is a schematic diagram showing a water treatment system according to a fourth embodiment of the invention and a water purifying plant to which the water treatment system is applied.

In the water purifying plant, for example, a sand basin 52 and a water basin 53, a flock-forming basin 54, a sedimentation basin 55, a middle mixing basin 56, a filter basin 57, a chlorine mixing-basin 58, and a distributing reservoir 59 are arranged from the upstream side of a flow route of raw water 51 supplied from a river to the downstream side. Further, in the course where the raw water 51 flows in the above respective basins 52 to 59, predetermined water treatments are carried out in the respective basins. Thereby, the raw water 51 is made into drinkable purified water 60, which is sent out from the distributing reservoir to respective water customers.

Specific procedures of water treatment will be explained hereinafter.

First, in the sand basin 52, large sands and dirts included initially in the raw water 51 are sent to the bottom. Thus, treatment water from which large sands and dirts have been removed flows into the water basin 53. When the treatment water flows from the sand basin 52 to the water basin 53, a "flow rate" of the treatment water is measured by a flow meter 61a. A measurement value of the flow rate is input to a front stage injection and radiation control unit 63. When the treatment water flows from the sand basin 52 to the water basin 53, a "turbidity" of the treatment water is measured by a turbidity measuring unit 64a. A measurement value of the turbidity is input to the front stage injection and radiation control unit 63.

Sodium hypochlorite of an amount designated by the front stage injection and radiation control unit 63 is injected to the water basin 53 via N units of injection pumps 65a. Further, to the water basin 53, ultraviolet of an amount designated by the front stage injection and radiation control unit 63 is radiated by N pieces of UV (ultraviolet) lamps 66a. Namely, the water basin 53 becomes a front stage injection and radiation point of sodium hypochlorite and ultraviolet. In addition to the above sodium hypochlorite, sodium hydroxide 67a is injected to the above water basin 53. With the sodium hydroxide 67a, the sodium hypochlorite and the ultraviolet, algicidal treatment and sterilization to algae and microbes included in the treatment water in the water basin 53 are carried out.

The turbidity measuring unit 64a incorporates: a turbidity meter for measuring the turbidity of the treatment water from the clarity of the treatment water in the water basin 53; a fine particle counter for counting the number of fine particles floating in the treatment water in the water basin 53; a fluorescence analyzer for detecting, for example, biological information of algae; and a UV (ultraviolet) meter for detecting a living matter by radiating ultraviolet of a wavelength, for example, 730 nm.

The purpose of injecting and radiating the sodium hypochlorite and the ultraviolet is algicidal treatment and sterilization to algae and microbes included in the treatment water. Herein, at a mass generation of algae and the like included in the treatment water, the turbidity increases. Thus, according to this turbidity, the target injection and radiation amount of the sodium hypochlorite and the ultraviolet is set. Namely, the "turbidity" sent from the turbidity measuring unit 64a to the front stage injection and radiation control unit 63 is the turbidity obtained by extracting algae and microbes as the main components from among the turbidity components shown by algae and diatoms, cyanobacteria, germs and sands and mud matters. More specifically, it is the turbidity obtained by correcting the optical turbidity determined from the clarity of the treatment water by use of respective measurement values of the fine particle counter, the fluorescence analyzer, and the UV (ultraviolet) meter.

Meanwhile, from the viewpoint of construction costs and the like, the turbidity measuring unit 64a may be configured by only a turbidity meter that measures the turbidity of the treatment water from the clarity of the treatment water.

The treatment water after the front stage (first) sterilization and algicidal treatment at the water basin 3 flows via a flow meter 61b and a turbidity measuring unit 64b to the flock-forming basin 54. Poly aluminum chloride (so-called PAC 68a) is injected into the treatment water in the flock-forming basin 54. Impurities included in the treatment water are solidified by the PAC 68a. This makes it possible to remove impurities included in the treatment water. Thereafter, the treatment water flows into the sedimentation basin 55 as a middle stage basin. The flow rate measured by the flow meter 61b is sent to a middle stage injection and radiation control unit 69. The turbidity measured by the turbidity measuring unit 64b is also sent to the middle stage injection and radiation control unit 69.

Sodium hypochlorite of an amount designated by the middle stage injection and radiation control unit 69 is injected to the sedimentation basin 55 via N units of injection pumps 65b. Further, to the sedimentation basin 55, ultraviolet of an amount designated by the middle stage injection and radiation control unit 69 is radiated by N UV (ultraviolet) lamps 66b. Therefore, the sedimentation basin 55 becomes a middle stage injection and radiation point of sodium hypochlorite and ultraviolet. In addition to the above sodium hypochlorite, sodium hydroxide 67b is injected to the sedimentation basin 55. With the sodium hydroxide 67b, the sodium hypochlorite and the ultraviolet, algicidal treatment and sterilization to algae and microbes included in the treatment water in the sedimentation basin 55 are carried out. In the sedimentation basin 55, fine particles included in the treatment water are deposited.

The treatment water after the middle stage (second) sterilization and algicidal treatment at the sedimentation basin 55 is added with PAC 86b in the next middle mixing basin 56. Thereafter, filtration is carried out in the next filter basin 57.

In the filter basin 57, the treatment water after filtration flows via a flow meter 61c and a turbidity measuring unit 64c to a chlorine mixing basin 58. A measurement value of the flow rate measured by the flow meter 61c is sent to a rear stage injection and radiation control unit 70. A measurement value of the turbidity measured by the turbidity measuring unit 64c is also sent to the rear stage injection and radiation control unit 70.

Sodium hypochlorite of an amount designated by the rear stage injection and radiation control unit 70 is injected to the chlorine mixing basin 58 via N units of injection pumps 65c. Further, to the chlorine mixing basin 58, ultraviolet of an amount designated by the rear stage injection and radiation control unit 70 is radiated by N UV (ultraviolet) lamps 66c. Thus, the chlorine mixing basin 58 becomes a rear stage injection and radiation point of sodium hypochlorite and ultraviolet.

Further, sodium hydroxide 67c is injected to the treatment water in the chlorine mixing basin 58. In the chlorine mixing basin 58, the content of chlorine included in the treatment water is adjusted, and a third algicidal treatment and sterilization is carried out by use of the sodium hydroxide 17c, the sodium hypochlorite and the ultraviolet. Thereafter, the treatment water is stored in the distributing reservoir 59. The stored treatment water is distributed as purified water 60 to respective customers.

Figure 9:
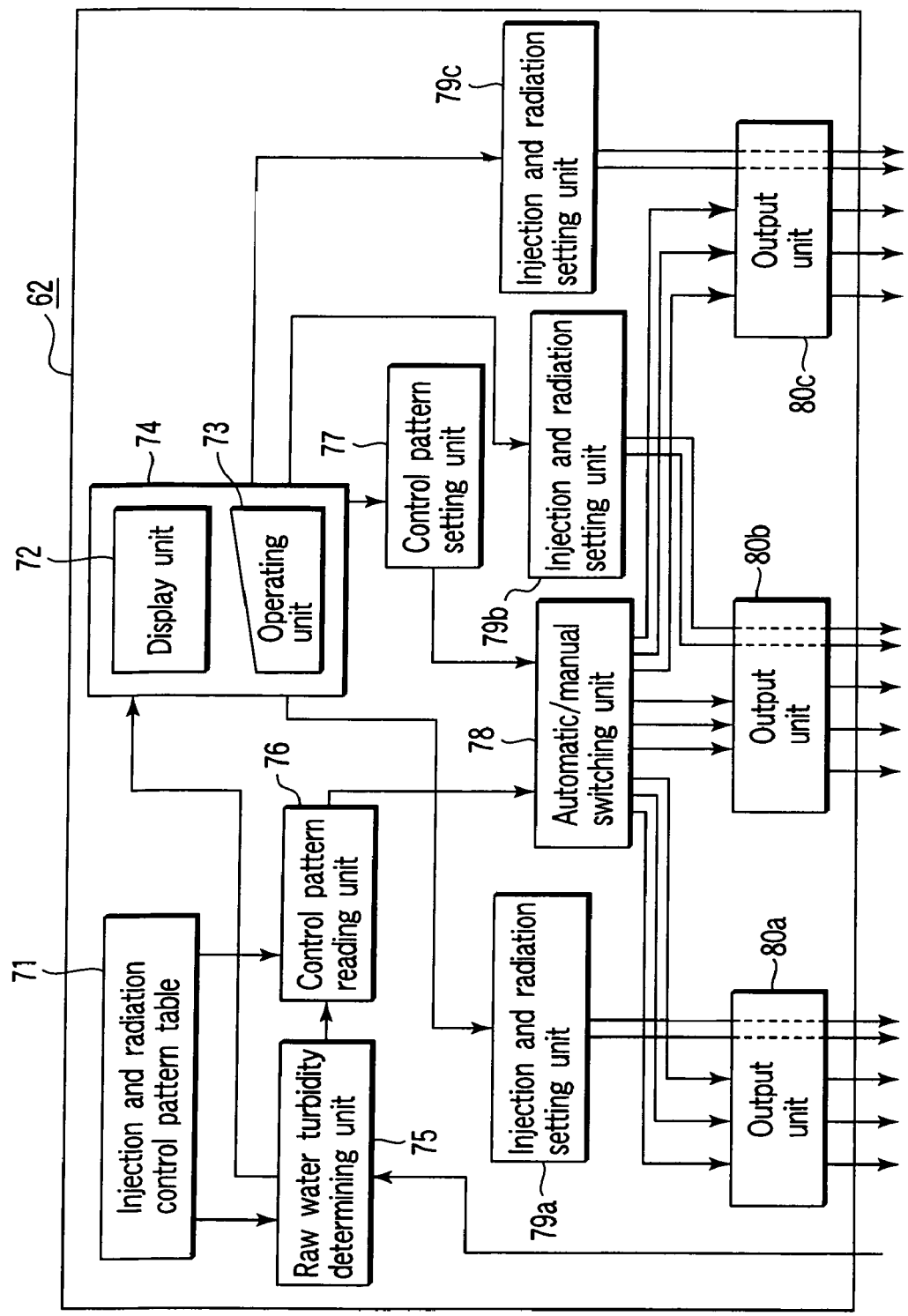
FIG. 9 is a block diagram showing a schematic configuration of a monitoring control unit 62 assembled in the water treatment system according to the fourth embodiment.

FIG. 9 is a block diagram showing a schematic configuration of a monitoring control unit 62 including a computer in the water treatment system. An injection and radiation control pattern table 71, an input/output unit 74 including a display unit 72 and an operating unit 73, and a raw water turbidity determining unit 75 are provided in the monitoring control unit 62. Meanwhile, the operating unit 73 includes a keyboard and a mouse.

Figures 10, 11:
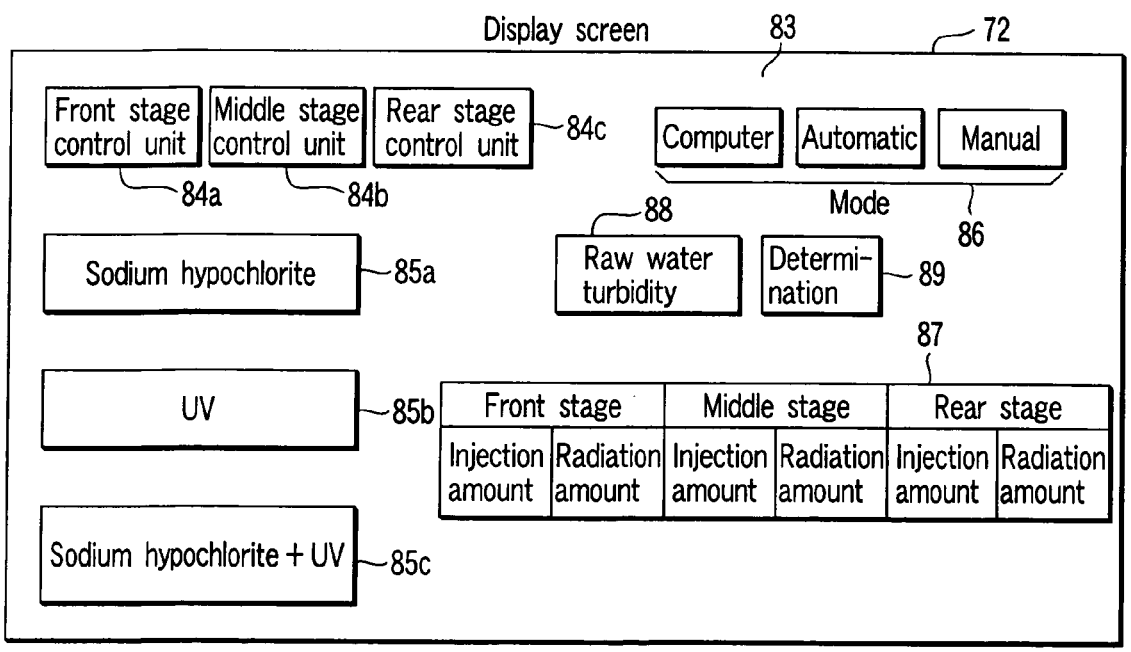
FIG. 10 shows recorded contents of an injection and radiation control pattern table 71 according to the fourth embodiment.
FIG. 11 is a view showing a display screen 83 of a display unit 72 according to the fourth embodiment.

The injection and radiation control pattern table 71 has stored therein data showing the treatment methods according to the turbidities in the water basin 53, the sedimentation basin 55, and the chlorine mixing basin 58. Specifically, as shown in FIG. 10, there are set respective turbidity ranges 81a, 81b and 81c, that is, the high turbidity (turbidity of 10 or higher, turbidity range 81a), the middle turbidity (turbidity of 5 or higher and lower than 10, turbidity range 81b), and the low turbidity (turbidity lower than 5, turbidity range 81c) with respect to the measurement value of the turbidity of the raw water 51 input from the turbidity measuring unit 64a in FIG. 8. A control pattern 82 for the sodium hypochlorite injection treatment or the ultraviolet radiation treatment is preset in response to the respective turbidity ranges 81a, 81b and 81c and the front stage unit (the water basin 53), the middle stage unit (the sedimentation basin 55), and the rear stage unit (the chlorine mixing basin 58).

For example, when the turbidity of the raw water 51 is at the high turbidity of 10 or higher (turbidity range 81a), the front stage injection and radiation control unit 63 performs the algicidal treatment and sterilization to the treatment water in the front stage water basin 53 by use of only sodium hypochlorite. Further, the middle stage injection and radiation control unit 69 performs the algicidal treatment and sterilization to the treatment water in the middle stage sedimentation basin 55 by use of only sodium hypochlorite. In addition, the rear stage injection and radiation control unit 70 performs the algicidal treatment and sterilization to the treatment water in the rear stage chlorine mixing basin 58 by use of sodium hypochlorite and ultraviolet.

When the turbidity of the raw water 51 is at the middle turbidity of 5 or higher and lower than 10 (turbidity range 81b), the front stage injection and radiation control unit 63 performs the algicidal treatment and sterilization to the treatment water in the front stage water basin 53 by use of ultraviolet and sodium hypochlorite. Further, the middle stage injection and radiation control unit 69 performs the algicidal treatment and sterilization to the treatment water in the middle stage sedimentation basin 55 by use of ultraviolet. In addition, the rear stage injection and radiation control unit 70 performs the algicidal treatment and sterilization to the treatment water in the rear stage chlorine mixing basin 58 by use of only sodium hypochlorite.

Moreover, when the turbidity of the raw water 51 is at the low turbidity lower than 5 (turbidity range 81c), the front stage injection and radiation control unit 63 performs the algicidal treatment and sterilization to the treatment water in the front stage water basin 53 by use of only ultraviolet. Further, the middle stage injection and radiation control unit 69 performs the algicidal treatment and sterilization to the treatment water in the middle stage sedimentation basin 55 by use of only ultraviolet. In addition, the rear stage injection and radiation control unit 70 performs the algicidal treatment and sterilization to the treatment water in the rear stage chlorine mixing basin 58 by use of sodium hypochlorite and ultraviolet.

The raw water turbidity determining unit 75 determines to which of the turbidity ranges 81a, 81b and 81c the measurement value of the turbidity of the raw water 51 input from the turbidity measuring unit 64a at the front stage in FIG. 8 belongs. The raw water turbidity determining unit displays the determination result and turbidity information on the display unit 72. Further, the raw water turbidity determining unit sends the determination result to a control pattern reading unit 76.

The control pattern reading unit 76 reads the respective control patterns 82 for the injection of sodium hypochlorite and the radiation of ultraviolet in the front stage unit, the middle stage unit, and the rear stage unit belonging to the turbidity ranges 81a, 81b and 81c. Then, the control pattern reading unit 76 sends the control patterns 82 via an automatic/manual switching unit 78 and respective output units 80a, 80b and 80c to the corresponding front stage injection and radiation control unit 63, the middle stage injection and radiation control unit 69, and the rear stage injection and radiation control unit 70.

When the operation mode is set to the "manual mode", the control pattern setting unit 77 sends out the control patterns 82 via the automatic/manual switching unit 78 switched to the manual mode and the respective output units 80a, 80b and 80c to the corresponding injection and radiation control units 63, 69 and 70. Herein, an operator refers to the turbidity ranges 81a, 81b and 81c of the raw water 51 displayed on the display unit 72, and inputs the control patterns corresponding to the front stage injection and radiation control unit 63, the middle stage injection and radiation control unit 69, and the rear stage injection and radiation control unit 70, via the operating unit 73.

Respective injection and radiation setting units 79a, 79b and 79c send the injection amount of sodium hypochlorite or the radiation amount of ultraviolet to the front stage injection and radiation control unit 63, the middle stage injection and radiation control unit 69, and the rear stage injection and radiation control unit 70. For more details, the injection and radiation setting units send the amount of sodium hypochlorite to be injected or the amount (set value) of ultraviolet to be radiated to the treatment water in the front stage unit (the water basin 53), the middle stage unit (the sedimentation basin 55), and the rear stage unit (the chlorine mixing basin 58), the amounts being designated by the operator with the operating unit 73, to the front stage injection and radiation control unit 63, the middle stage injection and radiation control unit 69, and the rear stage injection and radiation control unit 70 shown in FIG. 8 via the output units 80a, 80b and 80c.

FIG. 11 is a view showing a display screen 83 of the display unit 72 of the input/output unit 74. The display screen 83 has: control unit designation buttons 84a, 84b and 84c for designating the front stage injection and radiation control unit 63, the middle stage injection and radiation control unit 69, and the rear stage injection and radiation control unit 70, respectively; control patter designation buttons 85a, 85b and 85c for designating three kinds of control patterns 82 of the above-mentioned "sodium hypochlorite", "ultraviolet" and "sodium hypochlorite+ultraviolet"; and mode switching buttons 86 for switching and designating the control modes of the front stage injection and radiation control unit 63, the middle stage injection and radiation control unit 69, and the rear stage injection and radiation control unit 70, respectively.

Meanwhile, two or more of the control pattern designation buttons 85a, 85b and 85c are not pressed at one time with respect to one of the injection and radiation control units 63, 69 and 70. A "computer mode", "automatic mode", and "manual mode" can be selected as operation modes.

Further, in the display screen 83, there is arranged a set amount input unit 87 for writing the injection amount of sodium hypochlorite and the radiation amount of ultraviolet when the "manual mode" is selected. The set amount input unit 87 makes it possible for the operator to write the amount (injection amount per unit volume) of sodium hypochlorite to be injected to the treatment water in the front stage unit (the water basin 53), the middle stage unit (the sedimentation basin 55), and the rear stage unit (the chlorine mixing basin 58), and the amount (radiation amount per unit volume) of ultraviolet to be radiated thereto, through operation of the operating unit 75 such as a keyboard. Further, a raw water turbidity 88 and a turbidity determination result 89 input from the raw water turbidity determining unit 75 are displayed in the display screen 83.

Figure 12:
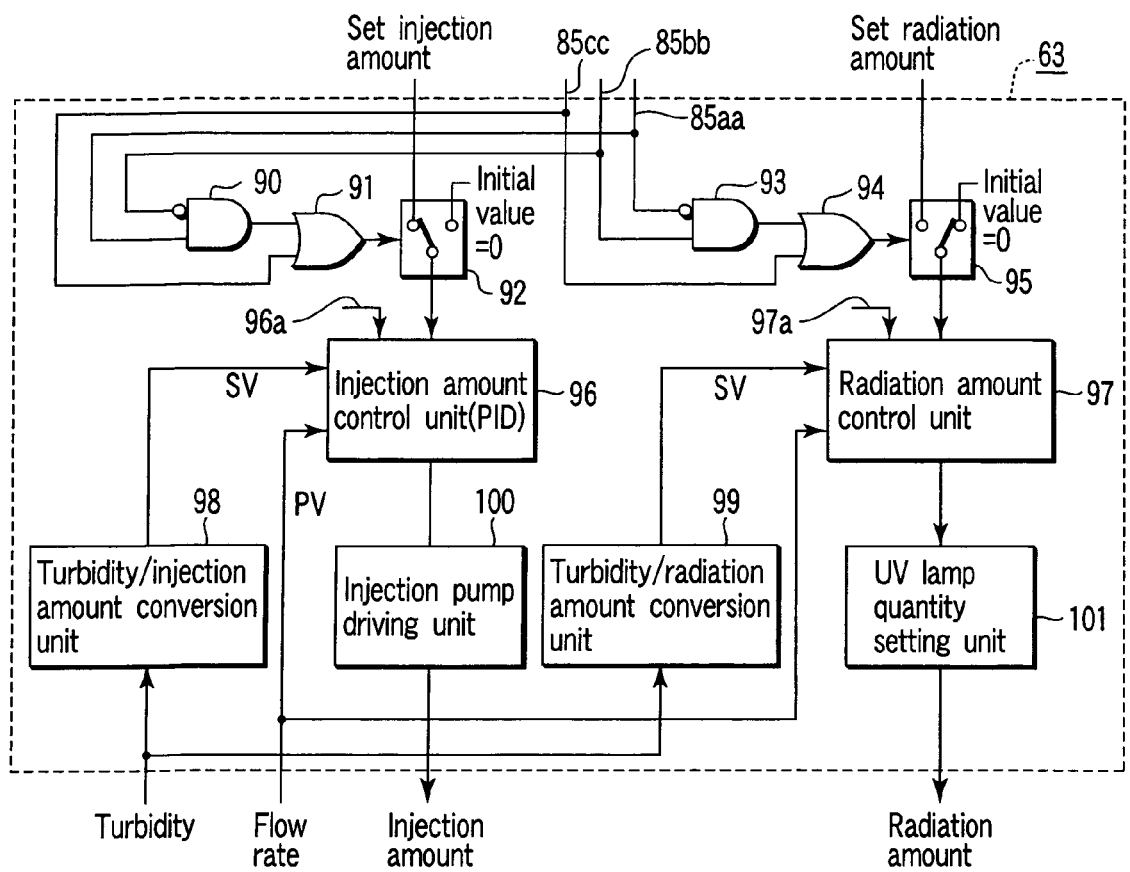
FIG. 12 is a block diagram showing a schematic configuration of a front stage injection and radiation control unit in the water treatment system according to the fourth embodiment.

FIG. 12 is a block diagram showing a schematic configuration of the front stage injection and radiation control unit 63. The middle stage injection and radiation control unit 69 and the rear stage injection and radiation control unit 70 have substantially the same configuration as that of the front stage injection and radiation control unit 63, and therefore, explanations thereof are omitted herein.

When, in the operating unit 73, the "computer mode" or the "automatic mode" is designated by the mode switching buttons 86, and the control pattern 82 of "sodium hypochlorite" is automatically designated to the front stage injection and radiation control unit 63, the monitoring control unit 62 inputs a drive command 96a via the output unit 80a to a sodium hypochlorite injection amount control unit 96. Because, in this case, the drive command 97a is not input to a radiation amount control unit 97 of ultraviolet, a radiation amount control unit 99 is not driven. Therefore, no ultraviolet is radiated to the treatment water in the water basin 53.

A turbidity/injection amount conversion unit 98 stores, as shown in FIG. 13A, relation information between a measurement value of the turbidity of treatment water (raw water 51) made to flow into the water basin 53, and a target injection amount (SV) per unit volume of sodium hypochlorite to be injected to the treatment water. In the turbidity/injection amount conversion unit 98, the input measurement value of the turbidity is converted into a value of an injection amount (SV) per unit volume of the sodium hypochlorite to be injected. Further, the converted value of the injection amount is sent to the injection amount control unit 96.

The injection amount control unit 96 performs a feed forward control (FF control). Specifically, the injection amount control unit 96 sends the injection amount (injection amount per unit time) obtained by multiplying the target injection amount (SV) per unit volume by the measurement value of the flow rate (PV) by the flow meter 61a to an injection pump driving unit 100. The injection pump driving unit 100 drives the number of injection pumps 65c according to the injection amount. As a result, sodium hypochlorite of the amount corresponding to the "turbidity" is injected to the treatment water in the water basin 53.

When, in the operating unit 73, the "computer mode" or the "automatic mode" is designated by the mode switching buttons 86, and the control pattern 82 of "ultraviolet" is automatically designated to the front stage injection and radiation control unit 63, the monitoring control unit 62 inputs a drive command 97a via the output unit 80a to an ultraviolet radiation amount control unit 97. On the other hand, the monitoring control unit does not input the drive command 96a via the output unit 80a to the sodium hypochlorite injection amount control unit 96. Therefore, the injection amount control unit 96 is not driven, so that sodium hypochlorite is not injected to the treatment water in the water basin 53.

A turbidity/radiation amount conversion unit 99 stores, as shown in FIG. 13B, relation information between a measurement value of the turbidity of treatment water (raw water 51) made to flow into the water basin 53, and a target radiation amount (SV) per unit volume of ultraviolet to be radiated to the treatment water. In the turbidity/radiation amount conversion unit 99, the input measurement value of the turbidity is converted into a value of the radiation amount (SV) per unit volume of ultraviolet to be radiated. Further, the converted value of the radiation amount is sent to the radiation amount control unit 97.

The radiation amount control unit 97 sends the radiation amount (radiation amount per unit time) obtained by multiplying the target injection amount (SV) per unit volume by the measurement value of the flow rate (PV) by the flow meter 61a to an UV lamp quantity setting unit 101. In the UV lamp quantity setting unit 101, as shown in FIG. 13C, relation information between the above multiplied radiation amount and the number of UV lamps 66a to be lit is stored. In the UV lamp quantity setting unit 101, the number of UV lamps 66a corresponding to the radiation amount designated from the radiation amount control unit 97 are lit. Thereby, ultraviolet of the amount corresponding to the measurement value of the turbidity is radiated to the treatment water in the water basin 53.

When, in the operating unit 73, the "computer mode" or the "automatic mode" is designated by the mode switching buttons 86, and the control pattern 82 of "sodium hypochlorite+ultraviolet" is automatically designated to the front stage injection and radiation control unit 63, the monitoring control unit 62 inputs the drive command 96a via the output unit 80a to the sodium hypochlorite injection amount control unit 96. Further, in this case, the monitoring control unit inputs the drive command 97a to the ultraviolet radiation amount control unit 97.

In the state where both of the injection amount control unit 96 and the radiation amount control unit 97 work, the injection of sodium hypochlorite and the radiation of ultraviolet are carried out to the treatment water in the water basin 53. For more details, the injection amount and the radiation amount separately designated in the injection amount control unit 96 and the radiation amount control unit 97 are changed into ½, respectively. The values of the injection amount and the radiation amount are sent to the injection pump driving unit 100 and the UV lamp quantity setting unit 101. This makes it possible to carry out the injection of sodium hypochlorite of the amount and the radiation of ultraviolet corresponding to the turbidity with respect to the treatment water in the front stage water basin 53.

Heretofore, there has been the specific operation executed by the front stage injection and radiation control unit 63 when, in the operating unit 73, the "computer mode" or the "automatic mode" is designated by the mode switching buttons 86, and the control patterns 82 of "sodium hypochlorite", "ultraviolet", and "sodium hypochlorite+ultraviolet" are respectively designated to the respective turbidity ranges 81a (high turbidity), 81b (middle turbidity), and 81c (low turbidity).

The middle stage injection and radiation control unit 69 has substantially the same configuration as that of the front stage injection and radiation control unit 63. Therefore, the specific operation which is executed by the middle stage injection and radiation control unit 69 with respect to the middle stage sedimentation basin 55 when, in the operating unit 73, the "computer mode" or the "automatic mode" is designated by the mode switching buttons 86, and the control patterns 82 of "sodium hypochlorite", "ultraviolet", and "sodium hypochlorite+ultraviolet" are respectively designated to the respective turbidity ranges 81a (high turbidity), 81b (middle turbidity), and 81c (low turbidity) of the "turbidity" of the raw water 51 in the monitoring control unit 62 are substantially same as that in the front stage injection and radiation control unit 63 explained previously.

Further, the rear stage injection and radiation control unit 70 also has substantially the same configuration as that of the front stage injection and radiation control unit 63. Therefore, the specific operation of the injection of sodium hypochlorite and the radiation of ultraviolet executed by the rear stage injection and radiation control unit 70 with respect to the chlorine mixing basin 58 are substantially same as that in the front stage injection and radiation control unit 63 explained previously.

Thus, in the injection and radiation control pattern table 71, the control patterns 82 of "sodium hypochlorite", "ultraviolet", and "sodium hypochlorite+ultraviolet" are respectively set to the respective turbidity ranges 81a (high turbidity), 81b (middle turbidity), and 81c (low turbidity) of the raw water 51. Therefore, when, in the operating unit 73, the "computer mode" or the "automatic mode" is designated by the mode switching buttons 86, it is possible to automatically perform the injection of sodium hypochlorite and the radiation of ultraviolet to the front stage water basin 53, the middle stage sedimentation basin 55, and the rear stage chlorine mixing basin 58 according to the control patterns 82 set in the injection and radiation control pattern table 71 in the monitoring control unit 62.

Meanwhile, as shown in the set contents of the injection and radiation control pattern table 71, in principle, the injection amount of sodium hypochlorite is restricted, and the radiation amount of ultraviolet is increased with respect to the front stage water basin 53. The injection amount of sodium hypochlorite is increased, and the radiation amount of ultraviolet is restricted with respect to the rear stage chlorine mixing basin 58. Thereby, it is possible to restrict the by-product matters (trihalomethanes generation) arising from the injection of the large amount of sodium hypochlorite to the front stage water basin 53 as much as possible. Namely, it is possible to improve the water quality safety of the purified water 60 supplied from the water purifying plant to customers further more.

On the other hand, when the turbidity of the raw water 51 flowing into the water purifying plant is high, the radiation amount of ultraviolet to the front stage water basin 53 is decreased, and the injection amount of sodium hypochlorite to the front stage water basin 53 is increased.

Thus, on the basis of combinations of the respective stages of the front stage, the middle stage, and the rear stage, and the turbidity ranges at the respective stages, the ratios of the injection amount of sodium hypochlorite and the radiation amount of ultraviolet at the respective stages are adjusted. As a consequence, algicidal treatment and sterilization can be carried out more sufficiently.

Moreover, when the injection amount of sodium hypochlorite in the entire water purifying plant is decreased, the chemical costs of sodium hypochlorite and aggregating agent PAC (poly aluminum chloride: chemical for aggregating and removing turbidity matters in water) and the like. This makes it possible to reduce the running cost of the water purifying plant.

Next, explanation will be given for the operation of the front stage injection and radiation control unit 63, the middle stage injection and radiation control unit 69, and the rear stage injection and radiation control unit 70 when the "manual mode" is selected by the mode switching buttons 86 in the operating unit 73.

Assuming that, in the operating unit 73, the "manual mode" is selected by the mode switching buttons 86 of 62, the "front stage injection and radiation control unit 63" is designated by the control unit designating button 84a, and further the "sodium hypochlorite" is designated by the control pattern designation button 85*a*. In this case, a designation signal 85*aa* showing the control pattern 82 of the "sodium hypochlorite" becomes its high level state. The designation signal 85*aa* is output from the output unit 80*a* of the monitoring control unit 62. Meanwhile, designation signals 85*bb*, 85*cc* showing the control patterns 82 of the "ultraviolet" and the "sodium hypochlorite+ultraviolet" remain at their low level states.

As a result, an AND gate 90 is established in the front stage injection and radiation control unit 63, and a set value switching circuit 92 is switched to its set injection amount side via an OR gate 91. The set injection amount is written into the column "front stage injection amount" in the set amount input unit 87 of the display screen 83, and is sent out from the injection and radiation setting unit 79*a* in FIG. 9. Namely, the set value of the injection amount of sodium hypochlorite which has been set by the operator is sent to the injection amount control unit 96.

When the "manual mode" is selected by the mode switching button 86 in the operating unit 73, the injection amount control unit 96 sends the injection amount (injection amount per unit time) obtained by multiplying the flow rate measured by the flow rate 61*a* by the set injection amount per unit volume, to the injection pump driving unit 100. In this case, the target injection amount with the converted turbidity of the water basin 53 output from the turbidity/injection amount conversion unit 98 is not used.

The injection pump driving unit 100 drives the number of injection pumps 65*c* corresponding to the injection amount. As a result, sodium hypochlorite of the amount designated by the operator via the operating unit 73 is injected to the treatment water of the water basin 53.

When, in the operating unit 73, the "manual mode" is selected by the mode switching buttons 86, and the "front stage injection and radiation control unit 63" is designated by the control unit designating button 84*a* while the "sodium hypochlorite" is pressed by the control pattern designation button 85*a*, the AND gate 93 is not established, and the output of the OR gate 94 is at its low level. Therefore, the set value switching circuit 95 switches to the initial value (=0) side.

When the "manual mode" is selected by the mode switching button 86, the radiation amount control unit 97 designates the radiation amount to the UV lamp quantity setting unit 101. Therefore, when the initial value is 0, ultraviolet is not substantially radiated to the treatment water in the water basin 53.

Namely, in the state where the "front stage injection and radiation control unit" is selected by the control unit designating button 84*a*, and the "sodium hypochlorite" is pressed by the control pattern designation button 85*a*, only sodium hypochlorite of the amount designated by the operator via the set amount input unit 87 is injected to the treatment water in the water basin 53.

Further, when the "manual mode" is selected by the mode switching buttons 86, and the "front stage injection and radiation control unit" is designated by the control unit designating button 84*a* while the "ultraviolet" is selected by the control pattern designation button 85*a*, the AND gate 90 is not established, and the output of the OR gate 91 is at its low level. In this case, the set value switching circuit 92 switches to the initial value (=0) side. As a result, for the same reason as that in the above-mentioned case of the radiation amount control unit 97, no ultraviolet is radiated to the treatment water in the water basin 53.

Conversely, when the AND gate 93 is established, the set value switching circuit 95 switches to the set radiation amount side via the OR gate 94. The set radiation amount is written into the column "front stage radiation amount" of the set amount input unit 87 in the display screen 83, and is sent via the injection and radiation setting unit 79*a* to the radiation amount control unit 97. Namely, the set value of ultraviolet set by the operator is input to the radiation amount control unit 97.

When the "manual mode" is selected by the mode switching buttons 86, the radiation amount control unit 97 sends the radiation amount (radiation amount per unit time) obtained by multiplying the set radiation amount per unit volume by the measurement value of the flow rate by the flow meter 61*a*, to the UV lamp quantity setting unit 101. The UV lamp quantity setting unit 101 turns on the number of UV lamps 66*a* according to the radiation amount. In this case, the target radiation amount with the converted turbidity of the water basin 53 output from the turbidity/radiation amount conversion unit 99 is not used.

That is, when the "front stage injection and radiation control unit" is selected by the control unit designating button 84*a*, and the "ultraviolet" is selected by the control pattern designation button 85*b*, ultraviolet of the amount designated by the operator via the set amount input unit 87 is radiated to the treatment water in the water basin 53.

In addition, assuming that the "manual mode" is selected by the mode switching buttons 86, the "front stage injection and radiation control unit" is designated by the control unit designating button 84*a*, and the "sodium hypochlorite+ultraviolet" is selected by the control pattern designation button 85*a*. In such a case, a designation signal 85*cc* showing the control pattern of the "sodium hypochlorite+ultraviolet" becomes its high level state. In this case, because the outputs of the respective OR gates 91, 94 are at their high level states, the set value switching circuits 92, 95 switch to the set injection amount side and the set radiation side, respectively. As a result, both of the injection amount control unit 96 and the radiation amount control unit 97 work. Sodium hypochlorite of the injection amount that the operator has written into the set amount input unit 87 on the display screen 83 is injected to the treatment water in the water basin 53. Further, ultraviolet of the radiation amount that the operator has written into the set amount input unit 87 is radiated to the treatment water in the water basin 53.

In this case, sodium hypochlorite and ultraviolet are separately injected or radiated. Therefore, the operator sets the set injection amount and the set radiation amount to half respectively as standards in comparison with the case where the injection amount control unit 96 and the radiation amount control unit 97 work in a single operation.

Heretofore, there has been explained the specific operation executed by the front stage injection and radiation control unit 63 when, in the operating unit 73, the "manual mode" is designated by the mode switching buttons 86, the "front stage injection and radiation control unit" is designated by the control unit designating button 84*a*, one of "sodium hypochlorite", "ultraviolet", and "sodium hypochlorite+ultraviolet" is designated by the control pattern designating buttons 85*a*, 85*b*, 85*c*, and the "injection amount" of sodium hypochlorite and the "radiation amount" of ultraviolet are designated by the set amount input unit 87.

In the same operation procedures, the operator can operate the middle stage injection and radiation control unit 69 and the rear stage injection and radiation control unit 70 indirectly via the operating unit 73. Thereby, the injection of sodium hypochlorite and the radiation of ultraviolet of the amounts set arbitrarily at the operating unit 73 can be made to the treatment water in the middle stage sedimentation basin 55 and the treatment water in the rear stage chlorine mixing basin 58.

By adopting the above-mentioned "manual mode", it is possible to temporarily change the injection of sodium hypochlorite and the radiation of ultraviolet to the treatment water in the front stage water basin 53, the middle stage sedimentation basin 55, and the rear stage chlorine mixing basin 58 even when the condition of the raw water 51 changes abruptly owing to a concentrated rainfall, or when the condition of the raw water 51 changes owing to a continuation of days with abnormally high temperatures.

Meanwhile, in the "computer mode" and the "automatic mode", the injection of sodium hypochlorite and the radiation of ultraviolet of the amounts according to the measurement value of the turbidities of the treatment water are carried out automatically with respect to the treatment water in the front stage water basin 53, the middle stage sedimentation basin 55, and the rear stage chlorine mixing basin 58 in the water purifying plant.

Herein, a further advantage in the operation of the water purifying plant by using radiation to algae removal will be explained hereinafter.

As a precondition, by use of aggregating chemicals (aggregation agents or pH adjusting agents, aggregation auxiliary agents), turbidity matters (suspended turbidity matters) are aggregated into flocks and then deposited in order to decrease the turbidity of raw water in a coagulation/sedimentation facility in the water purifying field. Then, in a filter basin at the front stage, these aggregated turbidity matters are removed by filtration in a sand filter basin and the like. In this point, blocking of the filter basin becomes conspicuous in a slow speed filter basin, a fast speed filter basin and the like, and therefore, it is necessary to decrease the turbidity of raw water in prior to some extent. Therefore, coagulation/sedimentation becomes especially important for the operation of the water purifying plant.

As mentioned previously, algae included in raw water are the main cause of filter basin blocking disorder factors, and aggregating agents are used in order to remove these algae.

With regard to this, an algicidal treatment is performed by ultraviolet and sodium hypochlorite before charging aggregating agents, whereby the cleaning cycle of the water purifying plant can be made longer. Therefore, it contributes to the reduction of the use amount of aggregating agents, the reduction of annual chemical costs, and the prevention of the filter basin blocking. Thus, the use of ultraviolet to algae removal is a significant advantage to those who perform a water treatment (mainly companies, local governments).

The present invention is not limited to the embodiments described above, but the present invention may be embodied in other specific forms without departing from the gift thereof. Further, by appropriate combinations of plural constitutional elements disclosed in each of the embodiments, it is possible to extract various stages of invention, which is apparent to those skilled in the art. For example, even when some constitutional elements are deleted from all the elements shown in the embodiments. Furthermore, some elements over different embodiments may be combined appropriately.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A water treatment system for causing input raw water to flow sequentially through a plurality of basins arranged in series along a flow route of the raw water, and performing a predetermined water treatment to the basins while the raw water is caused to flow through the basins, thereby supplying the input raw water as drinkable purified water, the system comprising:
 a front stage injection and radiation control unit which controls an injection amount of sodium hypochlorite and a radiation amount of ultraviolet with respect to treatment water in a water basin positioned at the front stage among the respective basins arranged in series in the flow route of the raw water;
 a middle stage injection and radiation control unit which controls an injection amount of sodium hypochlorite and a radiation amount of ultraviolet with respect to treatment water in a sedimentation basin positioned at the middle stage among the respective basins arranged in series in the flow route of the raw water;
 a rear stage injection and radiation control unit which controls an injection amount of sodium hypochlorite and a radiation amount of ultraviolet with respect to treatment water in a chlorine mixing basin positioned at the rear stage among the respective basins arranged in series in the flow route of the raw water;
 turbidity measuring means for measuring turbidity of the water upstream of the front stage, between the front stage and the middle stage, and between the middle stage and the rear stage, respectively;
 high turbidity pattern control means for, when the raw water turbidity measured by the turbidity measuring unit is a high turbidity over a predetermined upper reference value, instructing the front stage injection and radiation control unit to only inject sodium hypochlorite, instructing the middle stage injection and radiation control unit to only inject sodium hypochlorite, and instructing the rear stage injection and radiation control unit to inject sodium hypochlorite and radiate ultraviolet;
 middle turbidity pattern control means for, when the raw water turbidity measured by the turbidity measuring unit is a middle turbidity below the predetermined upper reference value and over a predetermined lower reference value, instructing the front stage injection and radiation control unit to inject sodium hypochlorite and radiate ultraviolet, instructing the middle stage injection and radiation control unit to only radiate ultraviolet, and instructing the rear stage injection and radiation control unit to only inject sodium hypochlorite; and
 low turbidity pattern control means for, when the raw water turbidity measured by the turbidity measuring unit is a low turbidity below the predetermined lower reference value, instructing the front stage injection and radiation control unit to only inject sodium hypochlorite, instructing the middle stage injection and radiation control unit to only radiate ultraviolet, and instructing the rear stage injection and radiation control unit to inject sodium hypochlorite and radiate ultraviolet;
 flow rate input amount means for measuring flow rates upstream of the front stage, between the front stage and the middle stage, and between the middle stage and the rear stage, respectively;
 wherein each of the high turbidity pattern control means, the middle turbidity pattern control means, and the low turbidity pattern control means instructs the front stage, middle stage, and rear stage injection and radiation control units in accordance with, respectively, a first product of the first flow rate and a value associated with the first turbidity, a second product of the second flow rate and a value associated with the third turbidity, and a third product of the third flow rate and a value associated with the third turbidity.

2. A water treatment system according to claim 1, wherein the turbidity measuring means for measuring the first, second, and third turbidities each include:
- a turbidity injection amount converting unit which converts the measured turbidity of the water as measured into a necessary injection amount of sodium hypochlorite; and
- a turbidity radiation amount converting unit which converts the measured turbidity of the water as measured into a necessary radiation amount of ultraviolet.

3. A water treatment system according to claim 2, wherein said plurality of basins further include at least a sand basin, a filter basin, and a distributing reservoir arranged from the upstream side to the downstream side of the flow route of the raw water.

4. A water treatment system according to claim 2, wherein the turbidity measuring means for measuring the first, second, and third turbidities each include means for correcting turbidities measured by turbidity meters by respective measurement values measured by a fluorescence analyzer, an ultraviolet meter, and a fine particle counter.

5. A water treatment system according to claim 1, wherein the turbidity measuring means for measuring the first, second, and third turbidities each include means for correcting turbidities measured by turbidity meters by respective measurement values measured by a fluorescence analyzer, an ultraviolet meter, and a fine particle counter.

6. A water treatment system according to claim 1, wherein said plurality of basins further include at least a sand basin, a filter basin, and a distributing reservoir arranged from the upstream side to the downstream side of the flow route of the raw water.

7. A water treatment system according to claim 2, further comprising:
- an ultraviolet lamp quantity setting unit which sets the number of ultraviolet lamps to be turned on at each of the front, middle and rear stages corresponding to the designated radiation amount, and
- an injection pump driving unit which sets the number of sodium hypochlorite injection pumps corresponding to the designated injection amount.

8. A water treatment system according to claim 7, wherein the respective turbidity measuring means each comprise means for correcting the turbidities measured by turbidity meters by respective measurement values measured by a fluorescence analyzer, an ultraviolet meter, and a fine particle counter.

* * * * *